(12) United States Patent
Wilkinson et al.

(10) Patent No.: US 8,881,119 B2
(45) Date of Patent: *Nov. 4, 2014

(54) COMPUTER PROGRAM PRODUCT CONTAINING INSTRUCTIONS FOR PROVIDING A PROCESSOR THE CAPABILITY OF EXECUTING AN APPLICATION DERIVED FROM A COMPILED FORM

(75) Inventors: Timothy J. Wilkinson, London (GB); Scott B. Guthery, Belmont, MA (US); Ksheerabdhi Krishna, Cedar Park, TX (US); Michael A. Montgomery, Cedar Park, TX (US)

(73) Assignee: Gemalto SA, Meudon (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,824

(22) Filed: Jun. 9, 2012

(65) Prior Publication Data

US 2012/0254844 A1 Oct. 4, 2012

Related U.S. Application Data

(63) Continuation of application No. 12/907,949, filed on Oct. 19, 2010, now Pat. No. 8,726,247, which is a continuation of application No. 11/537,156, filed on Sep. 29, 2006, now Pat. No. 7,818,727, which is a continuation of application No. 10/037,390, filed on Oct. 23, 2001, now Pat. No. 7,117,485, which is a continuation of application No. 08/957,512, filed on Oct. 24, 1997, now Pat. No. 6,308,317.

(60) Provisional application No. 60/029,057, filed on Oct. 25, 1996.

(51) Int. Cl.
*G06F 9/45* (2006.01)
*H04L 29/08* (2006.01)
(Continued)

(52) U.S. Cl.
CPC ............ *G06Q 20/3552* (2013.01); *H04L 67/02* (2013.01); *G06F 9/54* (2013.01);
(Continued)

(58) Field of Classification Search
CPC .................................. G06F 9/54; G06F 21/53
USPC .......................................................... 717/139
See application file for complete search history.

(56) References Cited

U.S. PATENT DOCUMENTS 4,256,955 A 3/1981 Giraud et al.
4,650,975 A 3/1987 Kitchener
(Continued)

FOREIGN PATENT DOCUMENTS

EP 0427465 A2 5/1991
EP 0718760 A1 6/1996
(Continued)

OTHER PUBLICATIONS

Defendant Google Inc.'s Answer to Plaintiff's complaint for Patent Infrigement and Counterclaims, Gemalto V. HTC, Civil Action No. 6:10-cv-561 (LED) (E.D.Tex. Feb. 25, 2011).

(Continued)

*Primary Examiner* — John Chavis
(74) *Attorney, Agent, or Firm* — The Jansson Firm; Pehr B. Jansson

(57) ABSTRACT

An integrated circuit card is used with a terminal. The integrated circuit card includes a memory that stores an interpreter and an application that has a high level programming language format. A processor of the card is configured to use the interpreter to interpret the application for execution and to use a communicator of the card to communicate with the terminal.

30 Claims, 23 Drawing Sheets

(51) Int. Cl.

| | | |
|---|---|---|
| *G06F 9/54* | (2006.01) | |
| *G06F 21/53* | (2013.01) | |
| *G06Q 20/34* | (2012.01) | |
| *G06F 21/77* | (2013.01) | |
| *G06F 21/79* | (2013.01) | |
| *G06F 9/455* | (2006.01) | |
| *G06F 9/445* | (2006.01) | |
| *H04L 29/06* | (2006.01) | |
| *G06F 21/62* | (2013.01) | |
| *G07F 7/10* | (2006.01) | |
| *H04W 12/06* | (2009.01) | |
| *H04W 12/00* | (2009.01) | |

(52) U.S. Cl.
CPC ............ *G06F 21/53* (2013.01); *G06Q 20/3574* (2013.01); *G06F 21/77* (2013.01); *G06F 8/52* (2013.01); *G06F 2221/2141* (2013.01); *G06Q 20/3563* (2013.01); *G06F 21/79* (2013.01); *G06F 9/45504* (2013.01); *G06F 9/44557* (2013.01); *H04L 29/06* (2013.01); *H04W 12/06* (2013.01); *H04L 67/38* (2013.01); *H04L 69/329* (2013.01); *G06F 2221/2153* (2013.01); *H04W 12/00* (2013.01); *G06F 21/6218* (2013.01); *G07F 7/1008* (2013.01); *G06F 8/443* (2013.01); *G06F 9/445* (2013.01)
USPC ........................................................ 717/139

(56) References Cited

U.S. PATENT DOCUMENTS

| | | | |
|---|---|---|---|
| 4,667,290 A | 5/1987 | Goss et al. | |
| 4,777,355 A | 10/1988 | Takahira | |
| 4,791,558 A | 12/1988 | Chaitin et al. | |
| 4,797,543 A | 1/1989 | Watanabe | |
| 4,874,935 A | 10/1989 | Younger | |
| 4,877,947 A | 10/1989 | Mori | |
| 4,905,138 A | 2/1990 | Bourne | |
| 4,928,001 A | 5/1990 | Masada | |
| 5,014,312 A | 5/1991 | Lisimaque et al. | |
| 5,064,999 A | 11/1991 | Okamoto et al. | |
| 5,133,072 A | 7/1992 | Buzbee | |
| 5,195,130 A | 3/1993 | Weiss et al. | |
| 5,210,876 A | 5/1993 | Uchida | |
| 5,307,492 A | 4/1994 | Benson | |
| 5,313,614 A * | 5/1994 | Goettelmann et al. ........ | 717/138 |
| 5,367,685 A | 11/1994 | Gosling | |
| 5,406,380 A | 4/1995 | Teter | |
| 5,450,575 A | 9/1995 | Sites | |
| 5,457,799 A | 10/1995 | Srivastava | |
| 5,469,572 A | 11/1995 | Taylor | |
| 5,500,517 A | 3/1996 | Cagliostro | |
| 5,519,866 A | 5/1996 | Lawrence et al. | |
| 5,537,474 A | 7/1996 | Brown et al. | |
| 5,544,086 A | 8/1996 | Davis et al. | |
| 5,550,919 A | 8/1996 | Kowalski | |
| 5,551,015 A * | 8/1996 | Goettelmann et al. ........ | 717/137 |
| 5,577,233 A * | 11/1996 | Goettelmann et al. ......... | 703/26 |
| 5,590,197 A | 12/1996 | Chen et al. | |
| 5,590,331 A | 12/1996 | Lewis et al. | |
| 5,604,802 A | 2/1997 | Holloway | |
| 5,613,012 A | 3/1997 | Hoffman et al. | |
| 5,613,120 A | 3/1997 | Palay et al. | |
| 5,650,761 A | 7/1997 | Gomm et al. | |
| 5,663,553 A | 9/1997 | Aucsmith | |
| 5,668,999 A | 9/1997 | Gosling | |
| 5,675,804 A | 10/1997 | Sidik et al. | |
| 5,679,945 A | 10/1997 | Renner et al. | |
| 5,689,565 A | 11/1997 | Spies et al. | |
| 5,692,132 A | 11/1997 | Hogan | |
| 5,734,150 A | 3/1998 | Brown et al. | |
| 5,742,756 A | 4/1998 | Dillaway et al. | |
| 5,748,964 A | 5/1998 | Gosling | |
| 5,761,306 A | 6/1998 | Lewis | |
| 5,764,989 A | 6/1998 | Gustafsson et al. | |
| 5,768,419 A | 6/1998 | Gundlach et al. | |
| 5,794,049 A | 8/1998 | Lindholm | |
| 5,799,138 A | 8/1998 | Yoshida | |
| 5,811,771 A | 9/1998 | Dethloff | |
| 5,815,657 A | 9/1998 | Williams et al. | |
| 5,826,088 A | 10/1998 | Sitbon et al. | |
| 5,835,772 A | 11/1998 | Thurlo | |
| 5,841,866 A | 11/1998 | Bruwer et al. | |
| 5,844,218 A | 12/1998 | Kawan et al. | |
| 5,848,274 A | 12/1998 | Hamby et al. | |
| 5,860,008 A | 1/1999 | Bradley | |
| 5,875,335 A * | 2/1999 | Beard ........................... | 717/139 |
| 5,889,941 A | 3/1999 | Tushie et al. | |
| 5,896,530 A | 4/1999 | White | |
| 5,905,895 A | 5/1999 | Halter | |
| 5,912,453 A | 6/1999 | Gungl | |
| 5,915,226 A | 6/1999 | Martineau | |
| 5,923,884 A | 7/1999 | Peyret et al. | |
| 5,940,516 A | 8/1999 | Mason et al. | |
| 5,946,487 A | 8/1999 | Dangelo | |
| 5,956,716 A | 9/1999 | Kenner et al. | |
| 5,963,980 A | 10/1999 | Coulier et al. | |
| 5,966,536 A | 10/1999 | Ravichandran | |
| 5,987,256 A | 11/1999 | Wu et al. | |
| 6,061,520 A | 5/2000 | Yellin et al. | |
| 6,075,863 A | 6/2000 | Krishnan et al. | |
| 6,078,744 A | 6/2000 | Wolczko et al. | |
| 6,094,528 A | 7/2000 | Jordan | |
| 6,151,703 A | 11/2000 | Crelier | |
| 6,223,984 B1 | 5/2001 | Renner et al. | |
| 6,226,789 B1 | 5/2001 | Tye et al. | |
| 6,233,733 B1 | 5/2001 | Ghosh | |
| 6,349,343 B1 | 2/2002 | Foody | |
| 6,438,573 B1 | 8/2002 | Nilsen | |
| 6,526,565 B1 | 2/2003 | Nally | |
| 6,535,903 B2 | 3/2003 | Yates et al. | |
| 2005/0097550 A1 | 5/2005 | Schwabe et al. | |
| 2008/0282238 A1 | 11/2008 | Meijer et al. | |

FOREIGN PATENT DOCUMENTS

| | | |
|---|---|---|
| EP | 0829828 A1 | 3/1998 |
| EP | 0889393 A2 | 1/1999 |
| FR | 2667171 A1 | 3/1992 |
| GB | 219029 A | 12/1987 |
| GB | 2261973 A | 6/1993 |
| JP | 204741 A | 9/1986 |
| JP | 63156254 A | 6/1988 |
| JP | 63156255 A | 6/1988 |
| WO | WO95/04328 A1 | 2/1995 |
| WO | WO9504328 A1 | 2/1995 |
| WO | WO96/25724 A1 | 8/1996 |
| WO | WO9720281 A1 | 6/1997 |
| WO | WO9750063 A2 | 12/1997 |
| WO | WO9819237 A1 | 5/1998 |

OTHER PUBLICATIONS

HTC Defendents Answer to Plaintiff'S Complaint for Patent Infringement and Counterclaims, Gemalto V. HTC, Civil Action No. 6:10-cv-561 (LED) (E.D.Tex. Feb. 25, 2011).
Amended Complaint for Patent Infringement, Gemalto V. HTC, Civil Action No. 6:10-cv-561 (LED) (E.D.Tex. Jan. 26, 2011).
Samsung Electronics Co., LTD and Samsung Telecommunications America LLC'S Answer to Plaintiff's amended Complaint for Patent Infringement, Gemalto V. HTC, Civil Action No. 6:10-cv-561 (LED) (E.D.Tex. Feb. 25, 2011).
Motorola Mobility's Answer to Plaintiff's Amended Complaint for Patent Infringement and Counterclaims, Gemalto V. HTC, Civil Action No. 6:10-cv-561 (LED) (E.D.Tex. Feb. 25, 2011).
*Gemalto S.A.* vs. *HTC Corporation, et al.*, Case No. 6:10-CV-561 LED-JDL, Report and Recommendation of United States Magistrate Judge, Jun. 25, 2012, United States District Court for the Eastern District of Texas, Tyler Division, whole Document.
*Gemalto S.A.* vs. *HTC Corporation, et al.*, Case No. 6:10-CV-561 LED-JDL, Memorandum Opinion and Order, Jun. 28, 2012, United

(56) References Cited

OTHER PUBLICATIONS

States District Court for the Eastern District of Texas, Tyler Division, whole Document and Appendix A.
Al Williams, Scaling Java, Embedded Systems Programming Magazine, Jun. 2001, http://www.eetimes.com/design/embedded/4023339/Scaling-Java (accessed on Mar. 6, 2012).
Manuel E. Benitez, et al., A Portable Global Optimizer and Linker, Proceedings of the SIGPLAN '88 Conference on Programming Language Design and Implementation, Atlanta, Georgia, Jun. 22-24, ACM, 1988, p. 329-338.
Parallax Inc: Origins, http://www.parallax.com/tabid/791/Default.aspx (accessed on Mar. 6, 2012).
p-System: Description, Background, Utilities, Education Technology Center, Dept. of Information and Computer Science, University of California, Irvine, CA, http://www.ics.uci.edu/~archive/documentation/p-system/p-system.html (accessed on Mar. 6, 2012).
Stephen Pelc, The Evolution of SENDIT Into EPIC, Proceedings of the 1996 Rochester Conference on Open Systems, Jun. 19-22, 1996, Ryerson Polytechnic University, Toronto, Ontario, Canada, Jun. 19-22, 1996, p. 63-67.
Peter Johannes, et al., A Platform-Independent Token System for Payment rerminals, Forth Dimensions, vol. XIX, No. 2, Jul.-Aug. 1997, pp. 7-11.
Open Terminal Architecture System Overview, Europay International SA, Waterloo, Belgium, Version 2.1, May 19, 1997.
Europay International, Open Terminal Architecture (OTA) for Multi-application Smart Card Terminals, Waterloo, Belgium, p. 1-6, whole document, 1996.
E. D. Rather and D. A. Ruffer, A Platform-independent Token System for Payment Terminals (V1), Forth, Inc., pp. 1-7, 1996.
E. D. Rather, S.F. Pelc, and P. Johannes, A Platform-independent Token System for Payment Terminals (V2), pp. 1-6, 1996.
E. D. Rather, et al., A Platform-independent Token System for Payment Terminals, Forth Dimensions XIX/2, No. 2, Jul.-Aug. 1997, Forth Interest Group, Carmel, CA, p. 7-11.
E. D. Rather, et al., The Europay Open Terminal Architecture, A Forth-based Token System for Payment Terminals, Proceedings of the 1996 Rochester Conference on Open Systems, Jun. 1996.
Peter Wayner, State of the Art Sun Gambles on Java Chips, BYTE, Nov. 1996, p. 79, 80, 82, 84, 86 and 88.
Claus M. Muller, Java—mehr als eine programmiersprache, Heidelberg, Germany, 1996 (in German, Translation not available).
Europay Announces OTA, Smart Card News, ISSN: 0967-196X, Brighton, England, Jul. 1996, p. 125.
E. D. Rather, et al., The Europay Open Terminal Archetecture a Forth-based Token System for Payment Terminals (2nd of 3 papers on OTA), Proceedings of the 1996 Rochester Conference on Open Systems, Jun. 1996, pp. 73-77.
Europay International S.A., Open Terminal Architecture (OTA) Specification, vol. 1: Virtual Machine Specification, Waterloo, Belgium, Version 3.3, Dec. 15, 1998.
Europay International S.A., Open Terminal Architecture (OTA) Specification, vol. 2: Forth Language Programming Interface, Waterloo, Belgium, Version 3.0, Feb. 11, 1999.
Europay International S.A., Open Terminal Architecture (OTA) Specification, vol. 3: C Language Programming Interface, Waterloo, Belgium, Version 3.2, Dec. 9, 1998.
Europay International S.A., Open Terminal Architecture (OTA) Specification, vol. 4: Mixed Language Programming, Waterloo, Belgium, Version 1.1, Jul. 1, 1997.
Europay International S.A., TKTP Reference Manual, Version 4.4, Mar. 10, 1999.
E. D. Rather, et al., The Europay Open Terminal Archetecture a Forth-based Token System for Payment Terminals 1st of 3 papers on OTA), Proceedings of the 1996 Rochester Conference on Open Systems, Jun. 1996, pp. 27-29.
Pierre Paradinas, et al., New Directions for Integrated Circuit Cards Operating Systems, Operating Systems Review, 29(1):56-61, 1995 (Accessed from http://cedric.cnam.fr/%7Eparadinas/presentation/OSR.pdf on Mar. 6, 2012).

Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Exhibit A of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-1 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-2 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-3 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-4 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-5 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-6 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-7 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-8 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-9 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-10 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-11 of: Invalidity Contentions filed with the US District Court for the Eastern District of Texas, Tyler Division, by a Defendant on

(56) References Cited

OTHER PUBLICATIONS

Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-12 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-13 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-14 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-15 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-16 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-17 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-18 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-19 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-20 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-21 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-22 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-23 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-24 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-25 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-26 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-27 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-28 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-29 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-30 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-31 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-32 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-33 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.

Chart A-34 of: Invalidity Contentions filed with the US District Court for the Eastern District of Texas, Tyler Division, by a Defendant on Oct. 31, 2011 in which arguments are presented that claims in US

(56) References Cited

OTHER PUBLICATIONS 6,308,317, US 7,117,485 and US 7,818,727 are invalid or unenforceable in *Gemalto S.A.* v. *HTC Corporation*, Civil Action No. 6:10-CV-561-LED.
Chart A-35 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Chart A-36 of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Exhibit B of: Invalidity Contentions filed with the US District Court for the Eastern District of Texas, Tyler Division, by a Defendant on Oct. 31, 2011 in which arguments are presented that claims in US 6,308,317, US 7,117,485 and US 7,818,727 are invalid or unenforceable in *Gemalto S.A.* v. *HTC Corporation*, Civil Action No. 6:10-CV-561-LED.
Gregory John Michaelson, Interpreter prototypers from formal language definitions, Apr. 1993, Thesis submitted for the degree of Doctor of Philosophy, Heriot-Watt University, Edinburgh, Scotland.
J. Bradley Chen, et al., Morph: A Framework for Platform-Specific Optimization, Mar. 12, 1996, whole document.
Scott Draves, Compiler Generation for Interactive Graphics using Intermediate Code, School of Computer Science, Carnegie Mellon University, Pitsburgh, PA.
Frederick Colville Knabe, Language Support for Mobile Agents, Dec. 1995, School of Computer Science Canegie Mellon University, Pittsburgh, PA 15213, Submitted in partial fulfillment of the requirements for the degree of Doctor of Philosophy.
Henry M. Wu, Scheme86 an Architecture for Microcoding a Scheme Interpreter, Aug. 1988, Artificial Intelligence Laboratory and Department of Electrical Engineering and Computer Science, Massachusetts Institute of technology., Cambridge, MA.
Christopher W. Fraser, et al., Custom Instruction Sets for Code Compression, Oct. 19, 1995, whole document.
David F. Bacon, et al., Compiler Transformations for High-Performance Computing, ACM Computing Surveys, vol. 26, No. 4, Dec. 1994, Computer Science Division, University of California, Berkeley, CA.
David S. Blickstein, et al., The GEM Optimizing Compiler System, Digital Technical Journal, vol. 4, No. 4, Special Issue 1992.
CASL Programmers Reference, whole document.
Enrico Ballarin, et al., Making a Compiler Easily Portable, May 1988, whole document, IEEE Software.
James Gosling, Java Intermediate Bytecodes, ACM SIGPLAN Workshop on Intemediate Representaions, 1995, San Francisco, CA.
Greg Hewgill, Jump User's Manual Version 1.0 Beta 4, Oct. 1997.
David G. Messerschmitt, Important future technologies—Java, —Corba, Department of Electrical Engineering and Computer Sciences, Lecture Mar. 30, 1997, whole document.
Daniel P. Miranker, et al., The Organization and Performance of a TREAT-Based Production System Compiler, IEE Transactions on Knowledge and Data Engineering, vol. 3, No. 1, Mar. 1991, p. 3-10.
Dave Birch, et al., Multi-Application Smartcard Platforms the third way, Hyperion Systems Limited, Nov. 14, 1998, p. 1-5.
Kin-Man Chung, et al., A "Tiny" Pascal Compiler, Part 1: The P-Code Interpreter, Sep. 1978, BYTE Publications Inc., whole article.
Thomas Gustafsson, Control, et al, Regsim: A Software Tool for Real Time Control and Simulation, 1995, p. 168-173, Lulea, Sweden.
William Rowan, A Lisp Compiler Producing Compact Code, Radiologic Imaging Laboratory, U.C., San Francisco and U.C. Berkeley, p. 216-222.
Stefano Crespi-Reghizzi, et al., PLZ-SYS PL/65 PL/M RPL/2 MISTRAL PLZ, Special Feature a Survey of Microprocessor Languages, Computer, Jan. 1980, p. 48-66, IEEE Computer Society Press, Los Alamitios, CA.
Kemal Ebcioglu, et al., VLIW Compilation Techniques in a Superscalar Environment, ACM SIG Plan Notices, vol. 29, No. 6, Jun. 20-24, 1994, Proceedings of the ACM SIGLAN '94 Conference on Programming Language Design and Implementation (PLDI) p. 36-48, Orlando, FL.
John Banning, The XDOS Binary Code Conversion System, Hunter Systems, 1989, p. 282-287, Mountain View, CA.
Cheng-Hsueh A. Hsieh, et al., Java Bytecode to Native Code Translation: The Caffeine Prototype and Preliminary Results, Published in the Proceedings of the 29th Annual International Symposium on Microarchitecture, p. 1-8, Dec. 2-4, 1996, Paris, France.
Palsberg Expert Report on Invalidity filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Exhibit A—to the Expert Report of Jens Palsberg, PH.D.: List of Materials Considered, filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Exhibit B—Curriculum Vitae of Jens Palsberg, PH.D.: List of Materials Considered, filed with the US District Court for the Eastern District of Texas, Tyler Division, on Dec. 6, 2012. *Gemalto S.A.* v. *HTC Corporation* Case 6:10-CV-561-LED relating to claims in U.S. Patent 6,308,317, 7,117,485, and 7,818,727.
Exhibit C—filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Supplemental Expert Report of Dr. Jens Palsberg, Ph.D. filed with the US District Court for the Eastern District of Texas, Tyler Division, on Dec. 7, 2012. *Gemalto S.A.* v. *HTC Corporation* Case 6:10-CV-561-LED relating to claims in U.S. Patent 6,308,317, 7,117,485, and 7,818,727.
Chart C-1 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-2 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-3 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-4 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-5 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
Chart C-6 filed with the US District Court for the Eastern District of Texas, Tyler Division, on Dec. 5, 2012. *Gemalto S.A.* v. *HTC Corporation* Case 6:10-CV-561-LED relating to claims in U.S. Patent 6,308,317, 7,117,485, and 7,818,727.
*Gemalto S.A.* vs. *HTC Corporation, et al.*, Case No. 6:10-CV-561 LED-JDL, Report and Recommendation of United States Magistrate Judge, Jun. 28, 2012, United States District Court for the Eastern District of Texas, Tyler Division, whole Document.
*Gemalto S.A.* vs. *HTC Corporation, et al.*, Case No. 6:10-CV-561 LED-JDL, Memorandum Opinion and Order, Jun. 28, 2012, United States District Court for the Eastern District of Texas, Tyler Division, whole Document and Appendix A.
Michal Cierniak, et al., Briki: a Fexible Java Compiler, Technical Report 621, May 1996, Department of Computer Science, University of Rochester, Rochester, NY.

(56) References Cited

OTHER PUBLICATIONS

Michal Cierniak, et al., Briki: an Optimizing Java Compiler, 1997, p. 179-184, Rochester, NY.

Adl-Tabatabai, Ali-Reza, et al., Efficient and Language-Independent Mobile Programs, Extended Abstract, School of Computer Science, Carnegie Mellon University, Pittsburgh, PA., Oct. 22, 1995.

Lucco, et al., Colusa Software White Paper, Omniware: A Universal Substrate for Mobile Code, 1995.

Steven Lucco, et al., Omniware: A Universal Substrate for Web Programming, 1995.

Walter R. Smith, The Newton Application Architecture, Proceedings of the 39th IEEE Computer Society International Conference, pp. 156-161, San Francisco, 1994.

Jonathan C. Hardwick, et al., Java as an Intermediate Language, Aug. 12, 1996, School of Computer Science, Carnegie Mellon University, Pittsburgh, PA.

Pierre Paradinas, et al., A Personal and Portable Database Server: the CQL Card, Lecture Notes in Computer Science (Applications of Databases), 1994, pp. 444-457, vol. 819.

Pieter H. Hartel, et al., Towards testability in smart card operating system design, 1994, p. 1-16.

Olivier Caron, et al., New architectures for smart cards: the OCEAN approach, 1994, p. 148-155.

Brian T. Lewis, et al., Clarity MCode: A Retargetable Intermediate Representation for Compilation, May, 1995, p. 119-128.

Jack W. Davidson, et al., Cint: A RISC Interpreter for the C Programming Language, 1987, p. 189-198, Association for Computing Machinery.

Richard P. Gabriel, Performance and Evaluation of Lisp Systems, The MIT Press in their Computer System Series. (ISBN 0-262-07093-6), Aug. 14, 1985, whole document, The Massachusetts Institute of Technology, Cambridge, Massachusetts.

David Gries, Compiler Construction for Digital Computers, 1971, John Wiley & Sons, Inc., Toronto, Canada.

General Magic, Inc., Telescript Language Reference, Oct. 1995., Sunnyvale, CA.

General Magic, Inc., Telescript Programming Guide, Oct. 19, 1995, Sunnyvale, CA.

Paul Tarau, et al., The Power of Partial Translation: An Experiment With the C-Ification of Binary Prolog, ACM, p. 152-156, 1995, ACM.

Frank Yellin, The JIT Compiler API, Oct. 4, 1996, p. 1-23.

James Gosling, et al., The JavaTM Language Environment a white Paper, Mountain View, CA, May 1996, whole document.

Olin Shivers, Supporting dynamic languages on the Java virtual machine, A.I. Memo No. 1576, Apr. 1996, Massachusetts Institute of Technology Artificial Intelligence Laboratory, Cambridge, MA., whole document.

Craig Chambers, et al., Whole-Program Optimisation of Object-Oriented Languages, Department of Computer Science and Engineering, Box 352350, University of Washington, Seattle, Washington, Technical Report, Jun. 6, 1996, whole document.

Bjarne Steensgaard, et al., Object and Native Code Thread Mobility Among Heterogeneous Computers, 1995, whole document, Association for Computing Machinery, Inc.

T.L. Harris, A just-in-time Java byte-code compiler, Oct. 22, 1996, Churchill College, p. 1-6, Churchill College.

Basic stamp user manual, 1993, whole document, Parallax, Inc.

Basic stamp I—Instruction List, 1993, whole document, Parallax, Inc.

Basic stamp—Syntax Description, 1993, whole document, Parallax, Inc.

Chuck McManis, Decoding the Basic Stamp, 1994, whole document.

Javelin Stamp, chapter 24, Dec. 14, 2004, whole document, Parallax.

* cited by examiner

|   | ┌ 100 |
|---|---|
| 0: | ALOAD 43 |
| 1: | 0 |
| 2: | ILOAD 21 |
| 3: | 1 |
| 4: | IFNE 154 2: |
| 5: | BIPUSH 16 |
| 6: | 5 |

|   | ┌ 102 |
|---|---|
| 0: | ALOAD 51 |
| 1: | 0 |
| 2: | ILOAD 50 |
| 3: | 1 |
| 4: | IFNE 27 2: |
| 5: | BIPUSH 49 |
| 6: | 5 |

COMPUTER PROGRAM PRODUCT CONTAINING INSTRUCTIONS FOR PROVIDING A PROCESSOR THE CAPABILITY OF EXECUTING AN APPLICATION DERIVED FROM A COMPILED FORM

CROSS REFERENCE TO RELATED APPLICATIONS

This application is a continuation application, under 35 U.S.C. §120, of application Ser. No. 12/907,949, filed Oct. 19, 2010, which is a continuation application of Ser. No. 11/537,156, filed Sep. 29, 2006, now U.S. Pat. No. 7,818,727, which is a continuation application of application Ser. No. 10/037,390, filed Oct. 23, 2001, now U.S. Pat. No. 7,117,485, which is a continuation of application Ser. No. 08/957,512, filed Oct. 24, 1997, now U.S. Pat. No. 6,308,317, and which, under 35 U.S.C. §119(e), claims benefit of prior U.S. provisional application Ser. No. 60/029,057, filed Oct. 25, 1996. This application is related to application Ser. No. 13/492,821 co-filed on even date herewith. The entire disclosures of these prior applications are incorporated herein in their entireties by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A CD-ROM Appendix, which includes Appendices A through I referred to hereinbelow, is enclosed herewith and from which can be derived files which taken together provide functionalities in accordance with the preferred embodiments of the present invention.

BACKGROUND OF THE INVENTION

This invention relates in general to the field of programming, and more particularly to using a high level programming language with a smart card or a microcontroller.

Software applications written in the Java high-level programming language have been so designed that an application written in Java can be run on many different computer brands or computer platforms without change. This is accomplished by the following procedure. When a Java application is written, it is compiled into "Class" files containing byte codes that are instructions for a hypothetical computer called a Java Virtual Machine. An implementation of this virtual machine is written for each platform that is supported. When a user wishes to run a particular Java application on a selected platform, the class files compiled from the desired application is loaded onto the selected platform. The Java virtual machine for the selected platform is run, and interprets the byte codes in the class file, thus effectively running the Java application.

Java is described in the following references which are hereby incorporated by reference: (1) Arnold, Ken, and James Gosling, "The Java Programming Language," Addison-Wesley, 1996; (2) James Gosling, Bill Joy, and Guy Steele, "The Java Language Specification," Sun Microsystems, 1996, (web site: http://java.sun.com/doc/language_specification); (3) James Gosling and Henry McGilton, "The Java Language Environment: A White Paper," Sun Microsystems, 1995 (web site: http://java.sun.com/doc/language_environment/); and (4) Tim Lindholm and Frank Yellin, "The Java Virtual Machine Specification," Addison-Wesley, 1997. These texts among many others describe how to program using Java.

In order for a Java application to run on a specific platform, a Java virtual machine implementation must be written that will run within the constraints of the platform, and a mechanism must be provided for loading the desired Java application on the platform, again keeping within the constraints of this platform.

Conventional platforms that support Java are typically microprocessor-based computers, with access to relatively large amounts of memory and hard disk storage space. Such microprocessor implementations frequently are used in desktop and personal computers. However, there are no conventional Java implementations on microcontrollers, as would typically be used in a smart card.

Microcontrollers differ from microprocessors in many ways. For example, a microprocessor typically has a central processing unit that requires certain external components (e.g., memory, input controls and output controls) to function properly. A typical microprocessor can access from a megabyte to a gigabyte of memory, and is capable of processing 16, 32, or 64 bits of information or more with a single instruction. In contrast to the microprocessor, a microcontroller includes a central processing unit, memory and other functional elements, all on a single semiconductor substrate, or integrated circuit (e.g., a "chip"). As compared to the relatively large external memory accessed by the microprocessor, the typical microcontroller accesses a much smaller memory. A typical microcontroller can access one to sixty-four kilobytes of built-in memory, with sixteen kilobytes being very common.

There are generally three different types of memory used: random access memory (RAM), read only memory (ROM), and electrically erasable programmable read only memory (EEPROM). In a microcontroller, the amount of each kind of memory available is constrained by the amount of space on the integrated circuit used for each kind of memory. Typically, RAM takes the most space, and is in shortest supply. ROM takes the least space, and is abundant. EEPROM is more abundant than RAM, but less than ROM.

Each kind of memory is suitable for different purposes. Although ROM is the least expensive, it is suitable only for data that is unchanging, such as operating system code. EEPROM is useful for storing data that must be retained when power is removed, but is extremely slow to write. RAM can be written and read at high speed, but is expensive and data in RAM is lost when power is removed. A microprocessor system typically has relatively little ROM and EEPROM, and has 1 to 128 megabytes of RAM, since it is not constrained by what will fit on a single integrated circuit device, and often has access to an external disk memory system that serves as a large writable, non-volatile storage area at a lower cost than EEPROM. However, a microcontroller typically has a small RAM of 0.1 to 2.0 K, 2K to 8K of EEPROM, and 8K-56K of ROM.

Due to the small number of external components required and their small size, microcontrollers frequently are used in integrated circuit cards, such as smart cards. Such smart cards come in a variety of forms, including contact-based cards, which must be inserted into a reader to be used, and contactless cards, which need not be inserted. In fact, microcontrollers with contactless communication are often embedded into specialized forms, such as watches and rings, effectively integrating the functionality of a smart card in an ergonomically attractive manner.

Because of the constrained environment, applications for smart cards are typically written in a low level programming language (e.g., assembly language) to conserve memory.

The integrated circuit card is a secure, robust, tamper-resistant and portable device for storing data. The integrated circuit card is the most personal of personal computers because of its small size and because of the hardware and software data security features unique to the integrated circuit card.

The primary task of the integrated circuit card and the microcontroller on the card is to protect the data stored on the card. Consequently, since its invention in 1974, integrated circuit card technology has been closely guarded on these same security grounds. The cards were first used by French banks as debit cards. In this application, before a financial transaction based on the card is authorized, the card user must demonstrate knowledge of a 4-digit personal identification number (PIN) stored in the card in addition to being in possession of the card. Any information that might contribute to discovering the PIN number on a lost or stolen card was blocked from public distribution. In fact, since nobody could tell what information might be useful in this regard, virtually all information about integrated circuit cards was withheld.

Due to the concern for security, applications written for integrated circuit cards have unique properties. For example, each application typically is identified with a particular owner or identity. Because applications typically are written in a low-level programming language, such as assembly language, the applications are written for a particular type of microcontroller. Due to the nature of low level programming languages, unauthorized applications may access data on the integrated circuit card. Programs written for an integrated circuit card are identified with a particular identity so that if two identities want to perform the same programming function there must be two copies of some portions of the application on the microcontroller of the integrated circuit card.

Integrated circuit card systems have historically been closed systems. An integrated circuit card contained a dedicated application that was handcrafted to work with a specific terminal application. Security checking when an integrated circuit card was used consisted primarily of making sure that the card application and the terminal application were a matched pair and that the data on the card was valid.

As the popularity of integrated circuit cards grew, it became clear that integrated circuit card users would be averse to carrying a different integrated circuit card for each integrated circuit card application. Therefore, multiple cooperating applications began to be provided on single provider integrated circuit cards. Thus, for example, an automated teller machine (ATM) access card and a debit card may coexist on a single integrated circuit card platform. Nevertheless, this was still a closed system since all the applications in the terminal and the card were built by one provider having explicit knowledge of the other providers.

The paucity of information about integrated circuit cards—particularly information about how to communicate with them and how to program them—has impeded the general application of the integrated circuit card. However, the advent of public digital networking (e.g., the Internet and the World Wide Web) has opened new domains of application for integrated circuit cards. In particular, this has lead to a need to load new applications on the card that do not have explicit knowledge of the other providers, but without the possibility of compromising the security of the card. However, typically, this is not practical with conventional cards that are programmed using low level languages.

SUMMARY OF THE INVENTION

In general, in one aspect, the invention features an integrated circuit card for use with a terminal. The integrated circuit card includes a memory that stores an interpreter and an application that has a high level programming language format. A processor of the card is configured to use the interpreter to interpret the application for execution and to use a communicator of the card to communicate with the terminal.

Among the advantages of the invention are one or more of the following. New applications may be downloaded to a smart card without compromising the security of the smart card. These applications may be provided by different companies loaded at different times using different terminals. Security is not compromised since the applications are protected against unauthorized access of any application code or data by the security features provided by the Java virtual machine. Smart card applications can be created in high level languages such as Java and Eiffel, using powerful mainstream program development tools. New applications can be quickly prototyped and downloaded to a smart card in a matter of hours without resorting to soft masks. Embedded systems using microcontrollers can also gain many of these advantages for downloading new applications, high level program development, and rapid prototyping by making use of this invention.

Implementations of the invention may include one or more of the following. The high level programming language format of the application may have a class file format and may have a Java programming language format. The processor may be a microcontroller. At least a portion of the memory may be located in the processor.

The application may have been processed from a second application that has a string of characters, and the string of characters may be represented in the first application by an identifier (e.g., an integer).

The processor may be also configured to receive a request from a requester (e.g., a processor or a terminal) to access an element (e.g., an application stored in the memory, data stored in the memory or the communicator) of the card, after receipt of the request, interact with the requester to authenticate an identity of the requester, and based on the identity, selectively grant access to the element.

The memory may also store an access control list for the element. The access control list furnishes an indication of types of access to be granted to the identity, and based on the access control list, the processor selectively grants specific types of access (e.g., reading data, writing data, appending data, creating data, deleting data or executing an application) to the requester.

The application may be one of a several applications stored in the memory. The processor may be further configured to receive a request from a requester to access one of the plurality of applications; after receipt of the request, determine whether said one of the plurality of applications complies with a predetermined set of rules; and based on the determination, selectively grant access to the requester to said one of the plurality of applications. The predetermined rules provide a guide for determining whether said one of the plurality of applications accesses a predetermined region of the memory. The processor may be further configured to authenticate an identity of the requester and grant access to said one of the plurality of applications based on the identity.

The processor may be also configured to interact with the terminal via the communicator to authenticate an identity; determine if the identity has been authenticated; and based on the determination, selectively allow communication between the terminal and the integrated circuit card.

The communicator and the terminal may communicate via communication channels. The processor may also be configured to assign one of the communication channels to the identity when the processor allows the communication between the terminal and the integrated circuit card. The processor may also be configured to assign a session key to the assigned communication channel and use the session key when the processor and the terminal communicate via the assigned communication channel.

The terminal may have a card reader, and the communicator may include a contact for communicating with the card reader. The terminal may have a wireless communication device, and the communicator may include a wireless transceiver for communicating with the wireless communication device. The terminal may have a wireless communication device, and the communicator may include a wireless transmitter for communicating with the wireless communication device.

In general, in another aspect, the invention features a method for use with an integrated circuit card and a terminal. The method includes storing an interpreter and at least one application having a high level programming language format in a memory of the integrated circuit card. A processor of the integrated circuit card uses the interpreter to interpret the at least one application for execution, and the processor uses a communicator of the card when communicating between the processor and the terminal.

In general, in another aspect, the invention features a smart card. The smart card includes a memory that stores a Java interpreter and a processor that is configured to use the interpreter to interpret a Java application for execution.

In general, in another aspect, the invention features a microcontroller that has a semiconductor substrate and a memory located in the substrate. A programming language interpreter is stored in the memory and is configured to implement security checks. A central processing unit is located in the substrate and is coupled to the memory.

Implementations of the invention may include one or more of the following. The interpreter may be a Java byte code interpreter. The security checks may include establishing firewalls and may include enforcing a sandbox security model.

In general, in another aspect, the invention features a smart card that has a programming language interpreter stored in a memory of the card. The interpreter is configured to implement security check. A central processing unit of the card is coupled to the memory.

In general, in another aspect, the invention features an integrated circuit card that is used with a terminal. The card includes a communicator and a memory that stores an interpreter and first instructions of a first application. The first instructions have been converted from second instructions of a second application. The integrated circuit card includes a processor that is coupled to the memory and is configured to use the interpreter to execute the first instructions and to communicate with the terminal via the communicator.

Implementations of the invention may include one or more of the following. The first and/or second applications may have class file format(s). The first and/or second applications may include byte codes, such as Java byte codes. The first instructions may be generalized or renumbered versions of the second instructions. The second instructions may include constant references, and the first instructions may include constants that replace the constant references of the second instructions. The second instructions may include references, and the references may shift location during the conversion of the second instructions to the first instructions. The first instructions may be relinked to the references after the shifting. The first instructions may include byte codes for a first type of virtual machine, and the second instructions may include byte codes for a second type of virtual machine. The first type is different from the second type.

In general, in another aspect, the invention features a method for use with an integrated circuit card. The method includes converting second instructions of a second application to first instructions of a first application; storing the first instructions in a memory of the integrated circuit card; and using an interpreter of the integrated circuit card to execute the first instructions.

In general, in another aspect, the invention features an integrated circuit for use with a terminal. The integrated circuit card has a communicator that is configured to communicate with the terminal and a memory that stores a first application that has been processed from a second application having a string of characters. The string of characters are represented in the first application by an identifier. The integrated circuit card includes a processor that is coupled to the memory. The processor is configured to use the interpreter to interpret the first application for execution and to use the communicator to communicate with the terminal.

In general, in another aspect, the invention features a method for use with an integrated circuit card and a terminal. The method includes processing a second application to create a first application. The second application has a string of characters. The string of characters is represented by an identifier in the second application. An interpreter and the first application are stored in a memory of the integrated circuit card. A processor uses an interpreter to interpret the first application for execution.

In general, in another aspect, the invention features a microcontroller that includes a memory which stores an application and an interpreter. The application has a class file format. A processor of the microcontroller is coupled to the memory and is configured to use the interpreter to interpret the application for execution.

In implementations of the invention, the microcontroller may also include a communicator that is configured to communicate with a terminal.

In general, in another aspect, the invention features a method for use with an integrated circuit card. The method includes storing a first application in a memory of the integrated circuit card, storing a second application in the memory of the integrated circuit card, and creating a firewall that isolates the first and second applications so that the second application cannot access either the first application or data associated with the first application.

In general, in another aspect, the invention features an integrated circuit card for use with a terminal. The integrated circuit card includes a communicator that is configured to communicate with the terminal, a memory and a processor. The memory stores applications, and each application has a high level programming language format. The memory also stores an interpreter. The processor is coupled to the memory and is configured to: a.) use the interpreter to interpret the applications for execution, b.) use the interpreter to create a firewall to isolate the applications from each other, and c.) use the communicator to communicate with the terminal.

Other advantages and features will become apparent from the following description and from the claims.

BRIEF DESCRIPTION OF THE DRAWING

FIG. 10 is a block diagram illustrating renumbering of original byte codes.

DETAILED DESCRIPTION OF THE PREFERRED EMBODIMENTS

Figure 1:
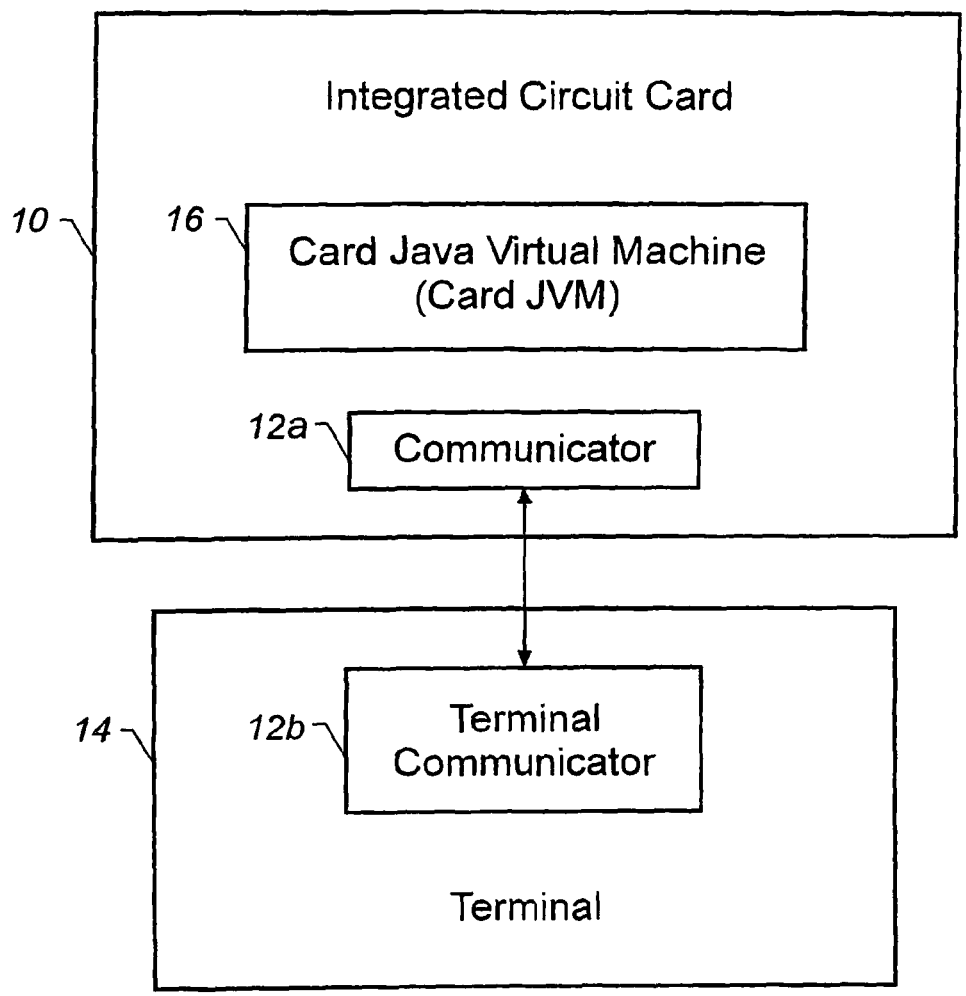
FIG. 1 is a block diagram of an integrated card system.

Referring to FIG. 1, an integrated circuit card 10 (e.g., a smart card) is constructed to provide a high level, Java-based, multiple application programming and execution environment. The integrated circuit card 10 has a communicator 12a that is configured to communicate with a terminal communicator 12b of a terminal 14. In some embodiments, the integrated circuit card 10 is a smart card with an 8 bit microcontroller, 512 bytes of RAM, 4K bytes of EEPROM, and 20K of ROM; the terminal communicator 12b is a conventional contact smart card reader; and the terminal 14 is a conventional personal computer running the Windows NT operating system supporting the personal computer smart card (PC/SC) standard and providing Java development support.

In some embodiments, the microcontroller, memory and communicator are embedded in a plastic card that has substantially the same dimensions as a typical credit card. In other embodiments, the microcontroller, memory and communicator are mounted within bases other than a plastic card, such as jewelry (e.g., watches, rings or bracelets), automotive equipment, telecommunication equipment (e.g., subscriber identity module (SIM) cards), security devices (e.g., cryptographic modules) and appliances.

The terminal 14 prepares and downloads Java applications to the integrated circuit card 10 using the terminal communicator 12b. The terminal communicator 12b is a communications device capable of establishing a communications channel between the integrated circuit card 10 and the terminal 14. Some communication options include contact card readers, wireless communications via radio frequency or infrared techniques, serial communication protocols, packet communication protocols, ISO 7816 communication protocol, to name a few.

The terminal 14 can also interact with applications running in the integrated circuit card 10. In some cases, different terminals may be used for these purposes. For example, one kind of terminal may be used to prepare applications, different terminals could be used to download the applications, and yet other terminals could be used to run the various applications. Terminals can be automated teller machines (ATMs), point-of-sale terminals, door security systems, toll payment systems, access control systems, or any other system that communicates with an integrated circuit card or microcontroller.

The integrated circuit card 10 contains a card Java virtual machine (Card JVM) 16, which is used to interpret applications which are contained on the card 10.

Figure 2:
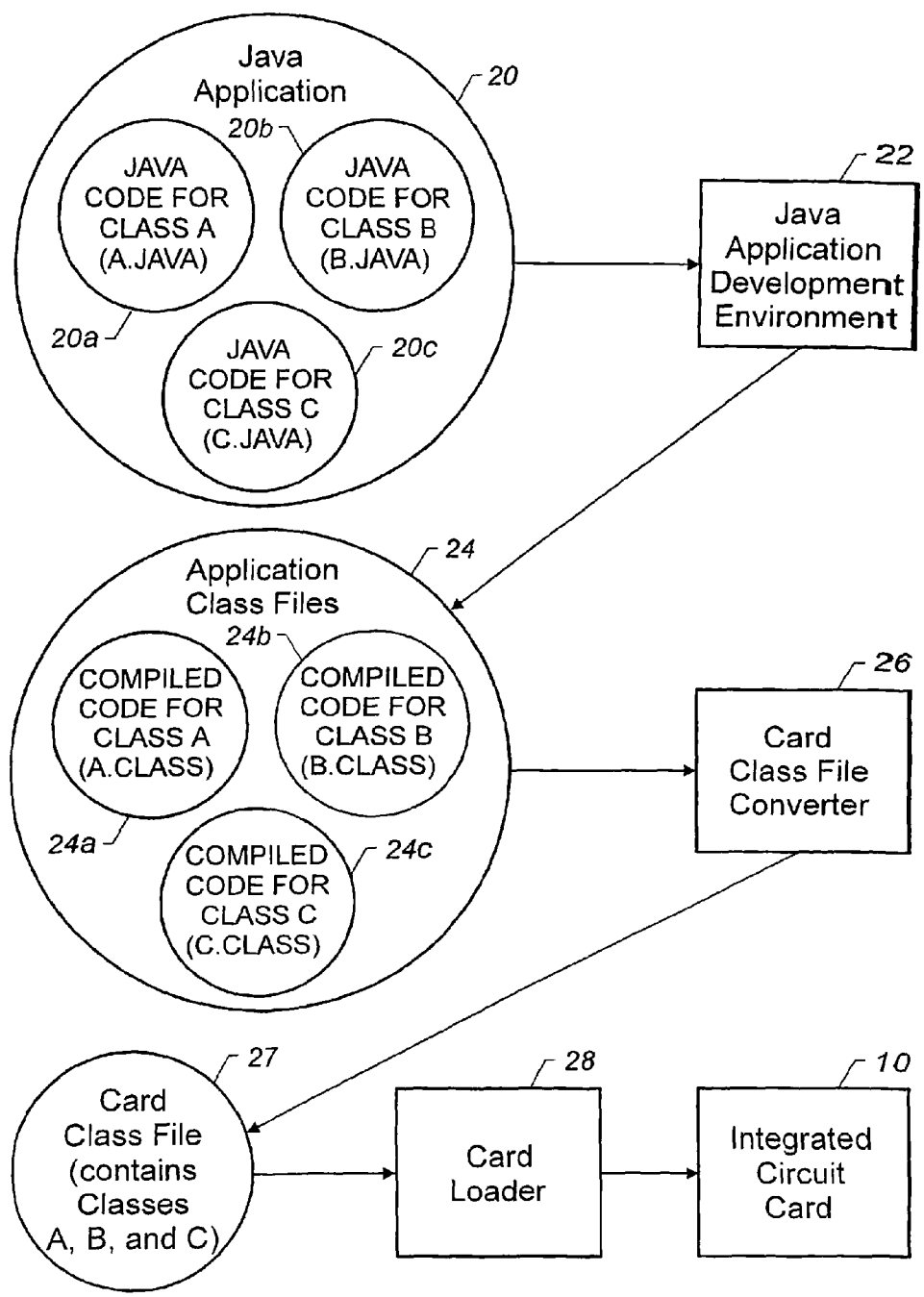
FIG. 2 is a flow diagram illustrating the preparation of Java applications to be downloaded to an integrated circuit card.

Referring to FIG. 2, the Java application 20 includes three Java source code files A.java 20a, B.java 20b, and C.java 20c. These source code files are prepared and compiled in a Java application development environment 22. When the Java application 20 is compiled by the development environment 22, application class files 24 are produced, with these class files A.class 24a, B.class 24b, and C.class 24c corresponding to their respective class Java source code 20a, 20b, and 20c. The application class files 24 follow the standard class file format as documented in chapter 4 of the Java virtual machine specification by Tim Lindholm and Frank Yellin, "The Java Virtual Machine Specification," Addison-Wesley, 1996. These application class files 24 are fed into the card class file converter 26, which consolidates and compresses the files, producing a single card class file 27. The card class file 27 is loaded to the integrated circuit card 10 using a conventional card loader 28.

Figure 3:
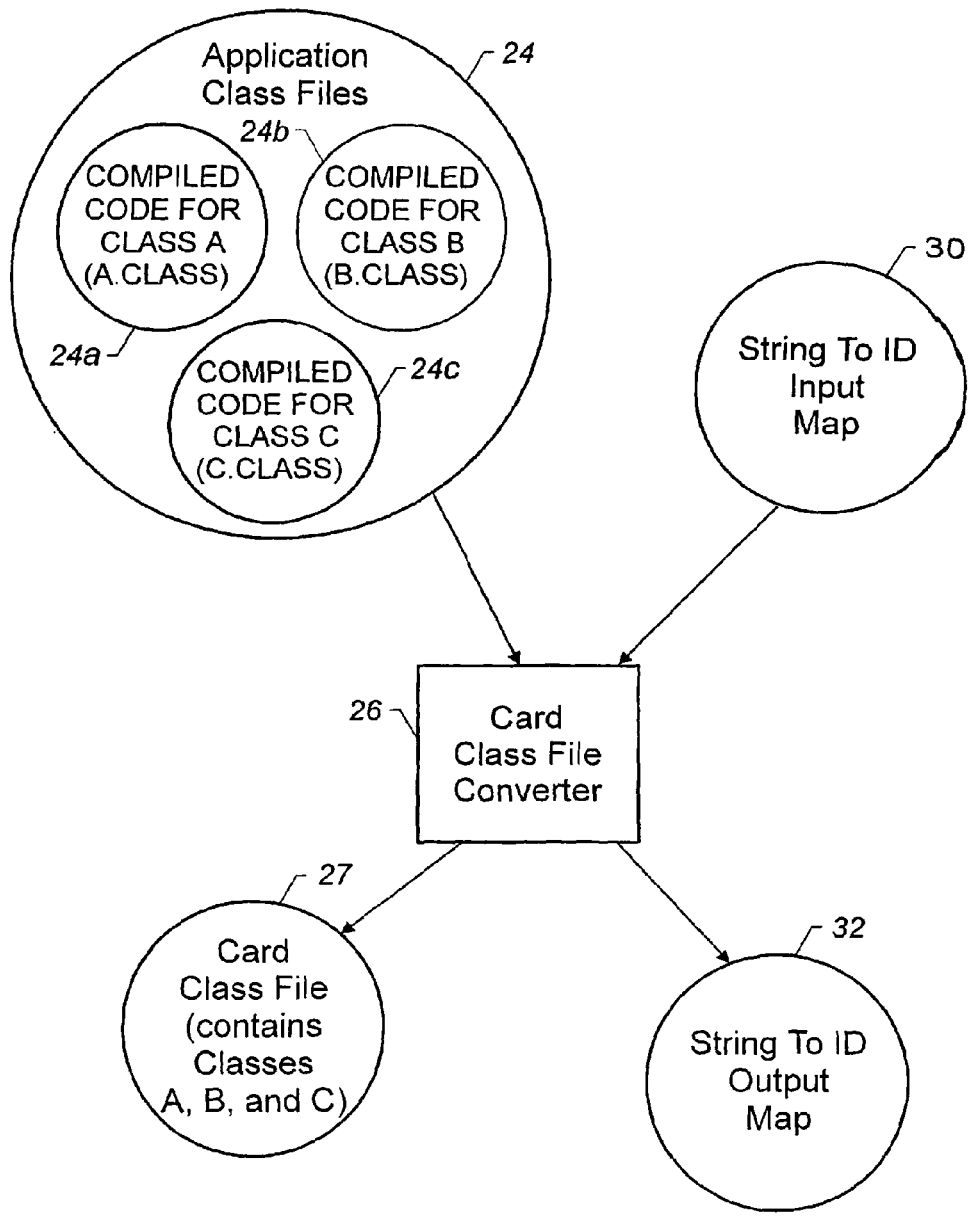
FIG. 3 is a block diagram of the files used and generated by the card class file converter.

Referring to FIG. 3, the card class file converter 26 is a class file postprocessor that processes a set of class files 24 that are encoded in the standard Java class file format, optionally using a string to ID input map file 30 to produce a Java card class file 27 in a card class file format. One such card class file format is described in Appendix A which is hereby incorporated by reference. In addition, in some embodiments, the card class file converter 26 produces a string to ID output map file 32 that is used as input for a subsequent execution of the card class file converter.

In some embodiments, in order for the string to ID mapping to be consistent with a previously generated card class file (in the case where multiple class files reference the same strings), the card class file converter 26 can accept previously defined string to ID mappings from a string to ID input map file 30. In the absence of such a file, the IDs are generated by the card class file converter 26. Appendix B, which is hereby incorporated by reference, describes one possible way of implementing and producing the string to ID input map file 30 and string to ID output map file 32 and illustrates this mapping via an example.

Figure 4:
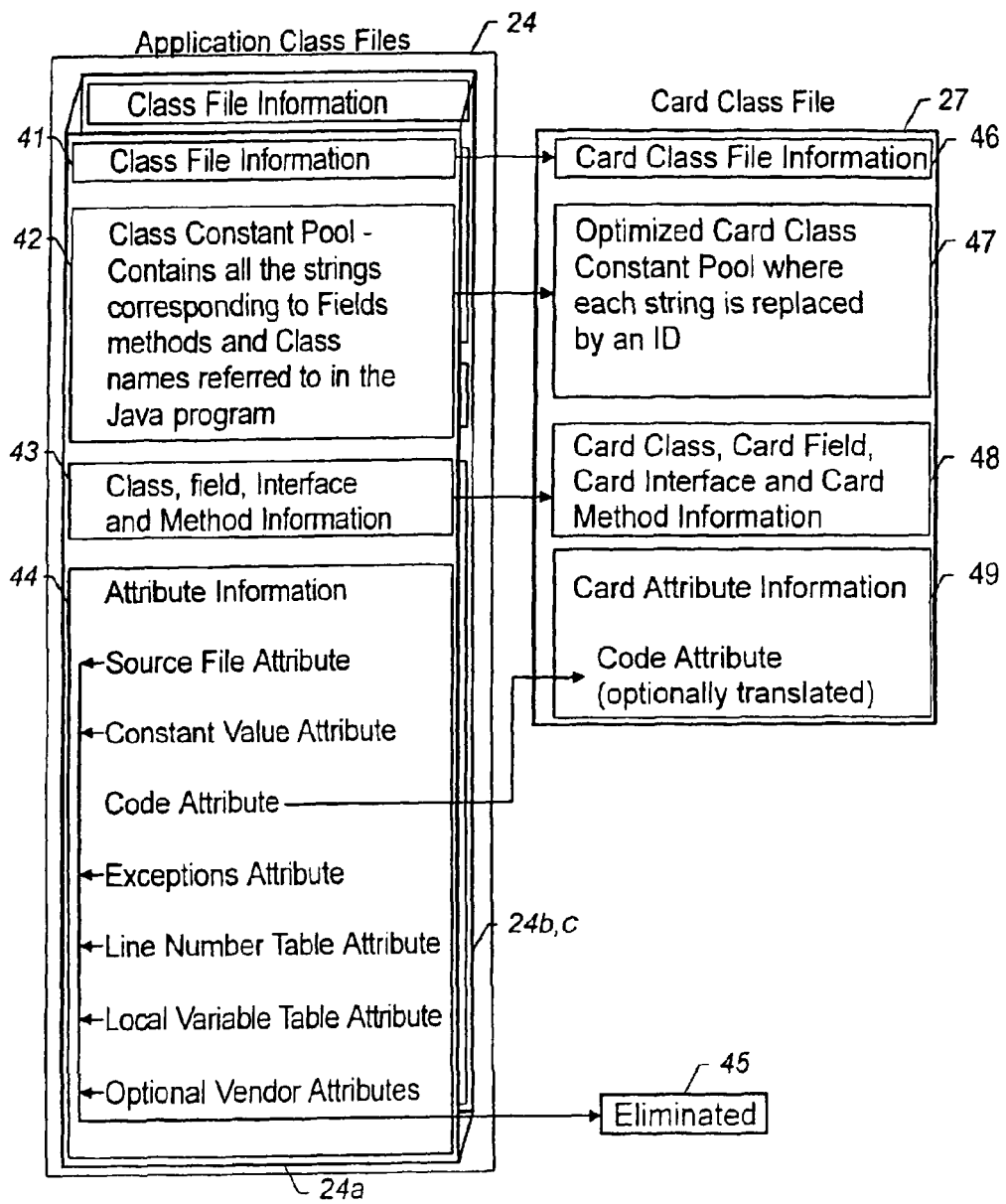
FIG. 4 is a block diagram illustrating the transformation of application class file(s) into a card class file.

Referring to FIG. 4, a typical application class file 24a includes class file information 41; a class constant pool 42; class, fields created, interfaces referenced, and method information 43; and various attribute information 44, as detailed in aforementioned Java Virtual Machine Specification. Note that much of the attribute information 44 is not needed for this embodiment and is eliminated 45 by the card class file converter 26. Eliminated attributes include SourceFile, ConstantValue, Exceptions, LineNumberTable, LocalVariableTable, and any optional vendor attributes. The typical card class file 27 as described in Appendix A is derived from the application class files 24 in the following manner. The card class file information 46 is derived from the aggregate class file information 41 of all application class files 24a, 24b, and 24c. The card class file constant pool 47 is derived from the aggregate class constant pool 42 of all application class files 24a, 24b, and 24c. The card class, fields created, interfaces referenced, and method information 48 is derived from the aggregate class, fields created, interfaces referenced, and method information 43 of all application class files 24a, 24b, and 24c. The card attribute information 49 in this embodiment is derived from only the code attribute of the aggregate attribute information 44 of all application class files 24a, 24b, and 24c.

Figure 5:
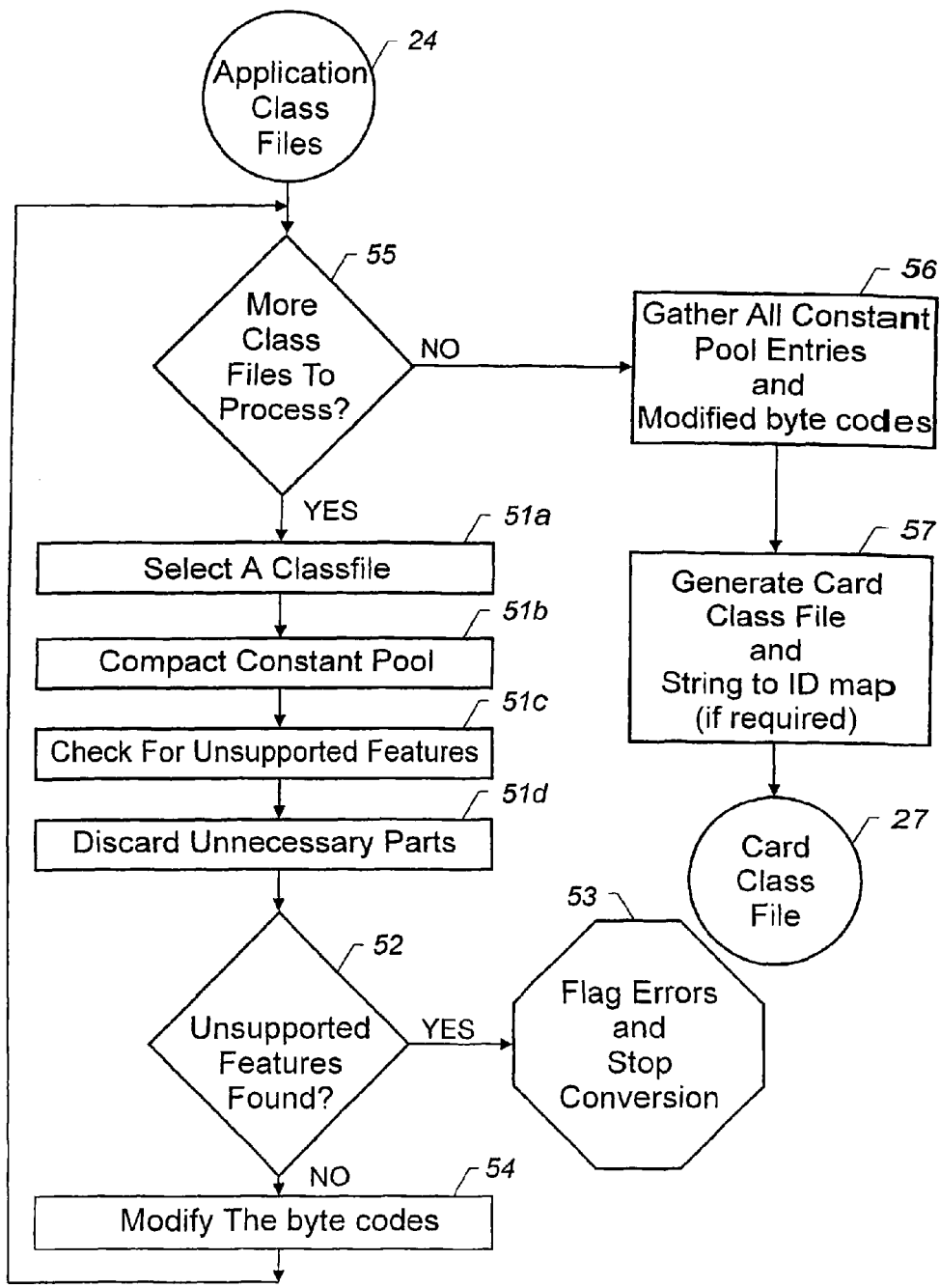
FIG. 5 is a flow diagram illustrating the working of the class file converter.

To avoid dynamic linking in the card, all the information that is distributed across several Java class files 24a, 24b, and 24c that form the application 24, are coalesced into one card class file 27 by the process shown in the flowchart in FIG. 5. The first class file to be processed is selected 51a. The constant pool 42 is compacted 51b in the following manner. All objects, classes, fields, methods referenced in a Java class file 24a are identified by using strings in the constant pool 42 of the class file 24a. The card class file converter 26 compacts the constant pool 42 found in the Java class file 24a into an optimized version. This compaction is achieved by mapping all the strings found in the class file constant pool 42 into integers (the size of which is microcontroller architecture dependent). These integers are also referred to as IDs. Each ID uniquely identifies a particular object, class, field or method in the application 20. Therefore, the card class file converter 26 replaces the strings in the Java class file constant pool 42 with its corresponding unique ID. Appendix B shows an example application HelloSmartCard.java, with a table below illustrating the IDs corresponding to the strings found in the constant pool of the class file for this application. The IDs used for this example are 16-bit unsigned integers.

Next, the card class file converter 26 checks for unsupported features 51c in the Code attribute of the input Java class file 24a. The Card JVM 16 only supports a subset of the full Java byte codes as described in Appendix C, which is hereby incorporated by reference. Hence, the card class file converter 26 checks for unsupported byte codes in the Code attribute of the Java class file 24a. If any unsupported byte codes are found 52, the card class file converter flags an error and stops conversion 53. The program code fragment marked "A" in APPENDIX D shows how these spurious byte codes are apprehended. Another level of checking can be performed by requiring the standard Java development environment 22 to compile the application 20 with a '-g' flag. Based on the aforementioned Java virtual machine specification, this option requires the Java compiler to place information about the variables used in a Java application 20 in the LocalVariableTable attribute of the class file 24a. The card class file converter 26 uses this information to check if the Java class file 24a references data types not supported by the Java card.

Next, the card class file converter 26 discards all the unnecessary parts 51c of the Java class file 24a not required for interpretation. A Java class file 24a stores information pertaining to the byte codes in the class file in the Attributes section 44 of the Java class file. Attributes that are not required for interpretation by the card JVM 16, such as SourceFile, ConstantValue, Exceptions, LineNumberTable, and LocalvariableTable may be safely discarded 45. The only attribute that is retained is the Code attribute. The Code attribute contains the byte codes that correspond to the methods in the Java class file 24a.

Modifying the byte codes 54 involves examining the Code attribute information 44 for each method in the class file, and modifying the operands of byte codes that refer to entries in the Java class file constant pool 42 to reflect the entries in the card class file constant pool 47. In some embodiments, the byte codes are also modified, as described below.

Figure 6:
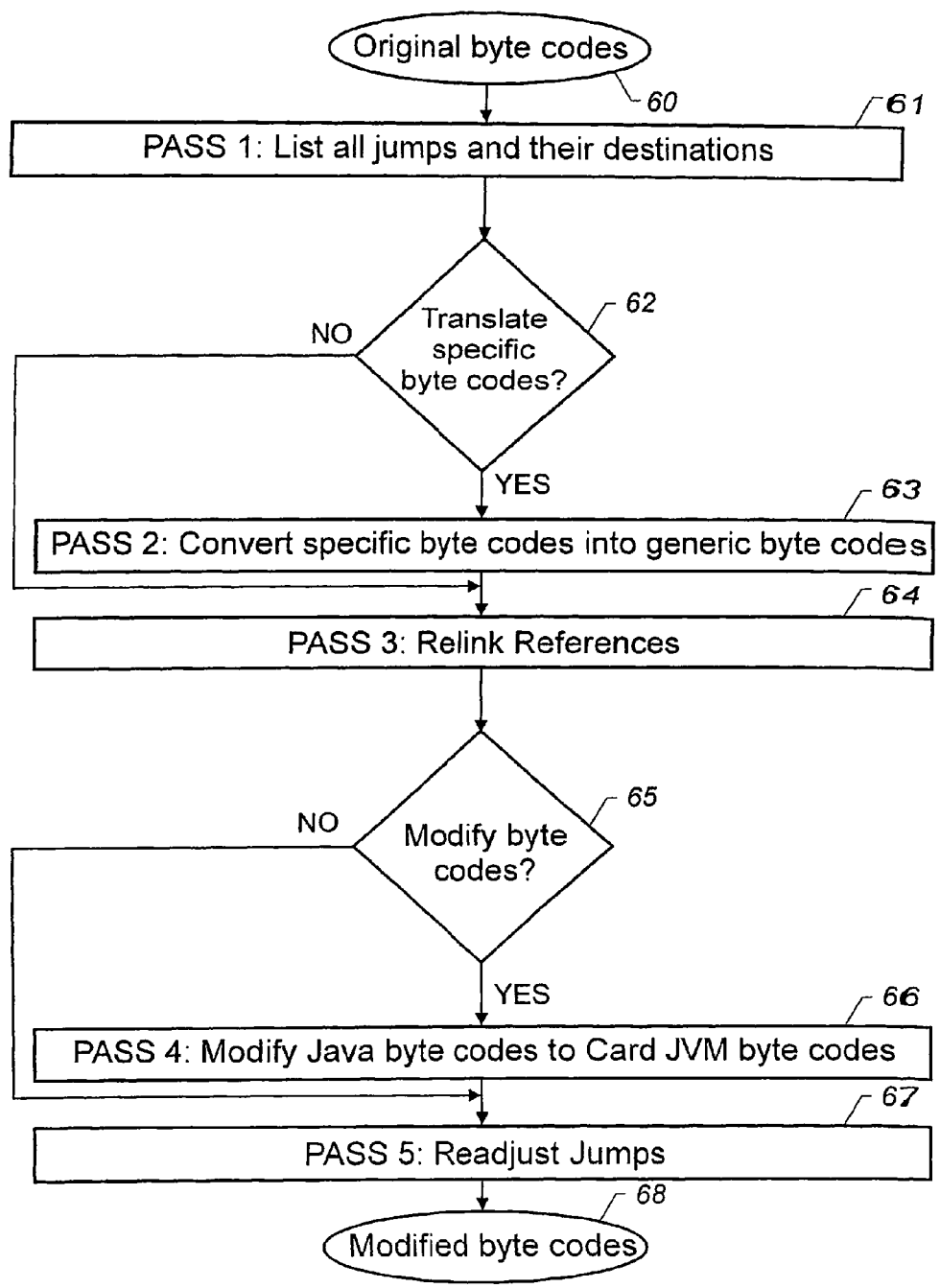
FIG. 6 is a flow diagram illustrating the modification of the byte codes.
Figure 7:
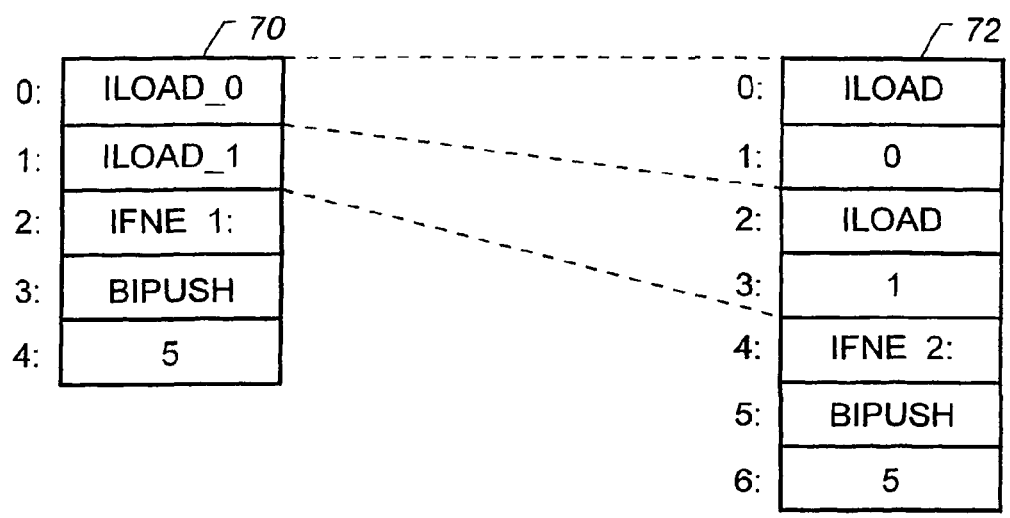
FIG. 7 is a block diagram illustrating the transformation of specific byte codes into general byte codes.

Modifying the byte codes 54 involves five passes (with two optional passes) as described by the flowchart in FIG. 6. The original byte codes 60 are found in the Code attribute 44 of the Java class file 24a being processed. The first pass 61 records all the jumps and their destinations in the original byte codes. During later byte code translation, some single byte code may be translated to dual or triple bytes. FIG. 7 illustrates an example wherein byte code ILOAD_0 is replaced with two bytes, byte code ILOAD and argument 0. When this is done, the code size changes, requiring adjustment of any jump destinations which are affected. Therefore, before these transformations are made, the original byte codes 60 are analyzed for any jump byte codes and a note made of their position and current destination. The program code fragment marked "B" in Appendix D shows how these jumps are recorded. Appendix D is hereby incorporated by reference.

Once the jumps are recorded, if the optional byte code translation is not being performed 62, the card class file converter 26 may proceed to the third pass 64.

Otherwise, the card class file converter converts specific byte codes into generic byte codes. Typically, the translated byte codes are not interpreted in the Card JVM 16 but are supported by converting the byte codes into equivalent byte codes that can be interpreted by the Card JVM 16 (see FIG. 7). The byte codes 70 may be replaced with another semantically equivalent but different byte codes 72. This generally entails the translation of short single specific byte codes such as ILOAD_0 into their more general versions. For example, ILOAD_0 may be replaced by byte code ILOAD with an argument 0. This translation is done to reduce the number of byte codes translated by the Card JVM 16, consequently reducing the complexity and code space requirements for the Card JVM 16. The program code fragment marked "C" in Appendix D shows how these translations are made. Note that such translations increase the size of the resulting byte code and force the re-computation of any jumps which are affected.

Figure 8:
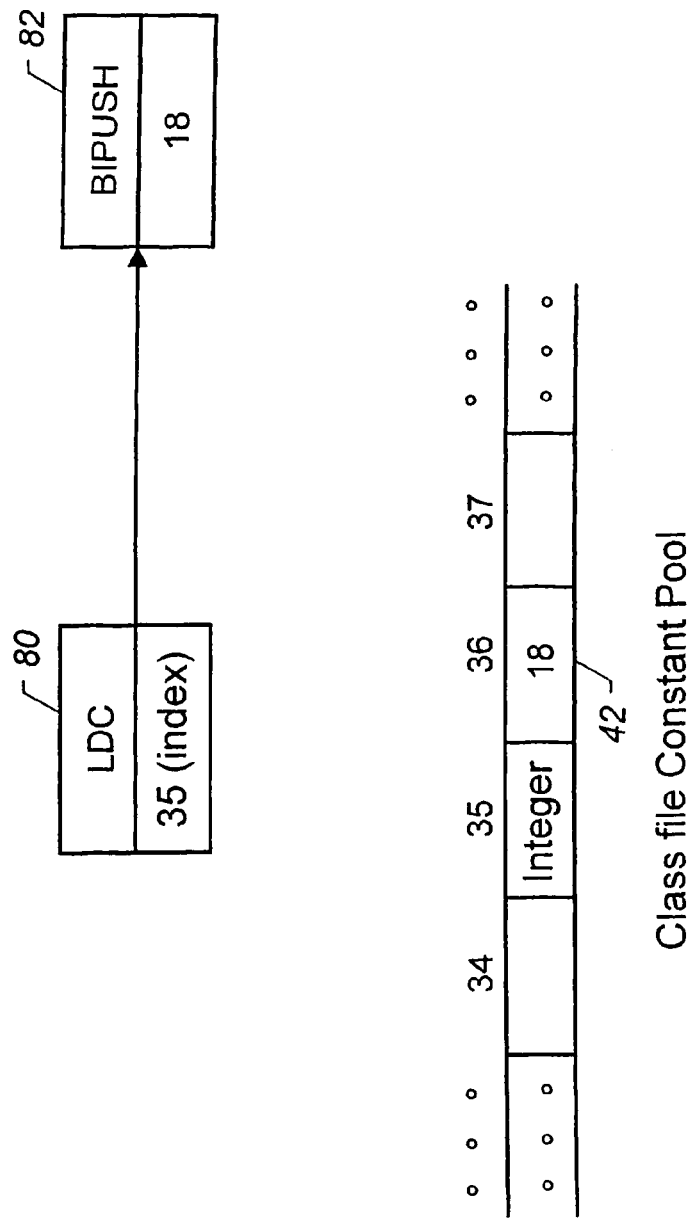
FIG. 8 is a block diagram illustrating the replacement of constant references with constants.
Figure 9:
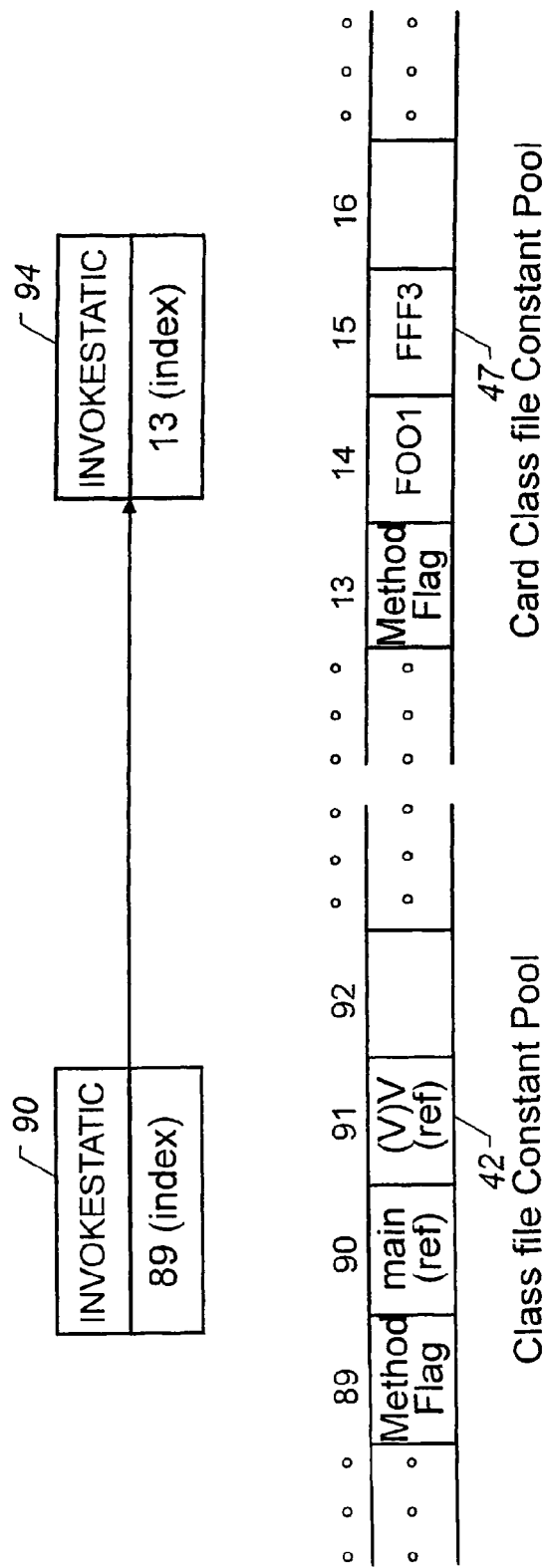
FIG. 9 is a block diagram illustrating the replacement of references with their updated values.

In the third pass 64, the card class file converter rebuilds constant references via elimination of the strings used to denote these constants. FIG. 8 shows an example wherein the byte code LDC 80 referring to constant "18" found via an index in the Java class file 24a constant pool 42 may be translated into BIPUSH byte code 82. In this pass the card class file converter 26 modifies the operands to all the byte codes that refer to entries in the Java class file constant pool 42 to reflect their new location in the card class file constant pool 47. FIG. 9 shows an example wherein the argument to a byte code, INVOKESTATIC 90, refers to an entry in the Java class file constant pool 42 that is modified to reflect the new location of that entry in the card class file constant pool 47. The modified operand 94 shows this transformation. The program code fragment marked "D" in Appendix D shows how these modifications are made.

Once the constant references are relinked, if the optional byte code modification is not being performed, the card class file converter may proceed to the fifth and final pass 67.

Otherwise, the card class file converter modifies the original byte codes into a different set of byte codes supported by the particular Card JVM 16 being used. One potential modification renumbers the original byte codes 60 into Card JVM 16 byte codes (see FIG. 10). This renumbering causes the byte codes 100 in the original byte codes 60 to be modified into a renumbered byte codes 102. Byte code ILOAD recognized by value 21 may be renumbered to be recognized by value 50. This modification may be done for optimizing the type tests (also known in prior art as Pass 3 checks) in the Card JVM 16. The program code fragment marked "E" in Appendix D shows an implementation of this embodiment. This modification may be done in order to reduce the program space required by the Card JVM 16 to interpret the byte code. Essentially this modification regroups the byte codes into Card JVM 16 byte codes so that byte codes with similar operands, results are grouped together, and there are no gaps between Card JVM 16 byte codes. This allows the Card JVM 16 to efficiently check Card JVM 16 byte codes and validate types as it executes.

Figure 11:
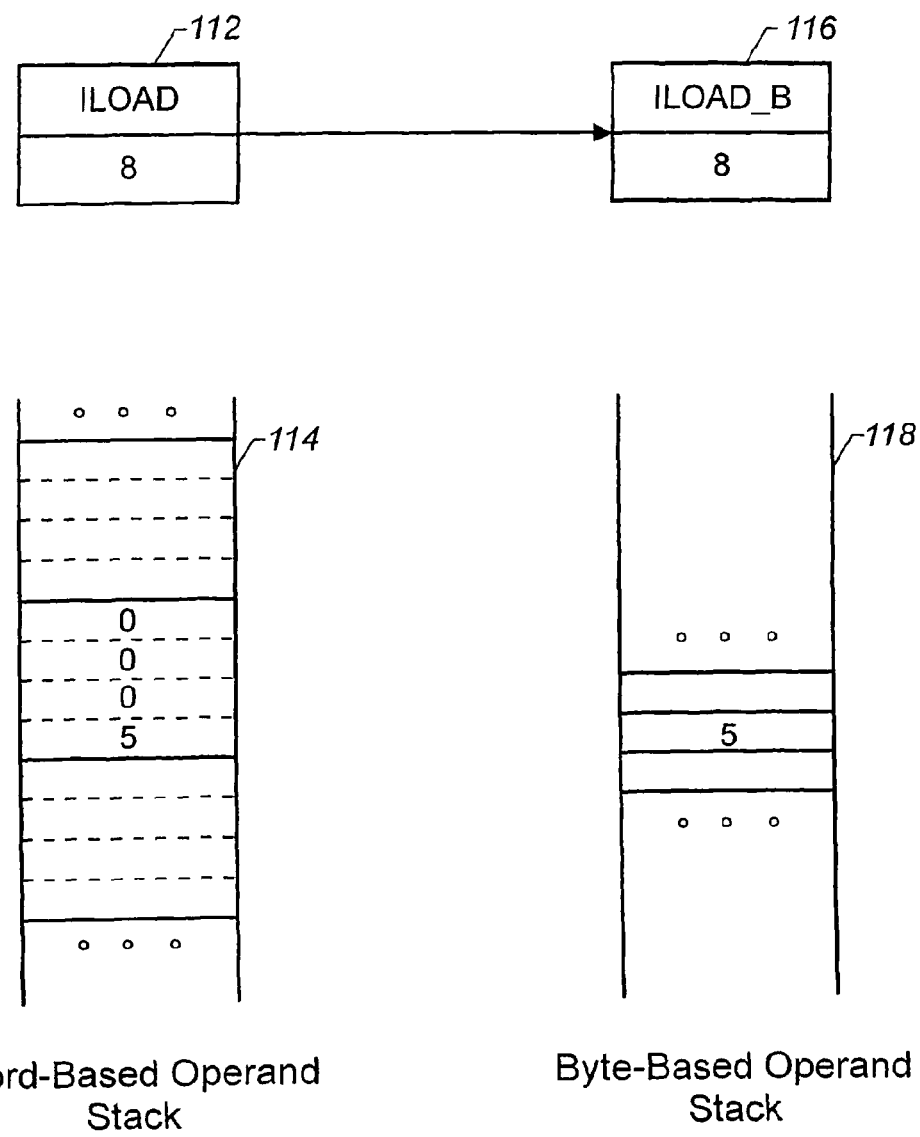
FIG. 11 is a block diagram illustrating translation of original byte codes for a different virtual machine architecture.

In some embodiments, the card class file converter modifies the original byte codes 60 into a different set of byte codes designed for a different virtual machine architecture, as shown in FIG. 11. The Java byte code ILOAD 112 intended for use on a word stack 114 may be replaced by Card JVM 16 byte code ILOAD_B 116 to be used on a byte stack 118. An element in a word stack 114 requires allocating 4 bytes of stack space, whereas an element in the byte stack 118 requires only one byte of stack space. Although this option may provide an increase in execution speed, it risks losing the security features available in the original byte codes.

Since the previous steps 63, 64 or 66 may have changed the size of the byte codes 60 the card class file converter 26 has to relink 67 any jumps which have been effected. Since the jumps were recorded in the first step 61 of the card class file converter 26, this adjustment is carried out by fixing the jump destinations to their appropriate values. The program code fragment marked "F" in Appendix D shows how these jumps are fixed.

The card class file converter now has modified byte codes 68 that is equivalent to the original byte codes 60 ready for loading. The translation from the Java class file 24a to the card class file 27 is now complete.

Referring back to FIG. 5, if more class files 24 remain to be processed 55 the previous steps 51a, 51b, 51c, 52 and 54 are repeated for each remaining class file. The card class file converter 26 gathers 56 the maps and modified byte codes for the classes 24 that have been processed, places them as an aggregate and generates 57 a card class file 27. If required, the card class file converter 26 generates a string to ID output map file 32, that contains a list of all the new IDs allocated for the strings encountered in the constant pool 42 of the Java class files 24 during the translation.

Figure 12:
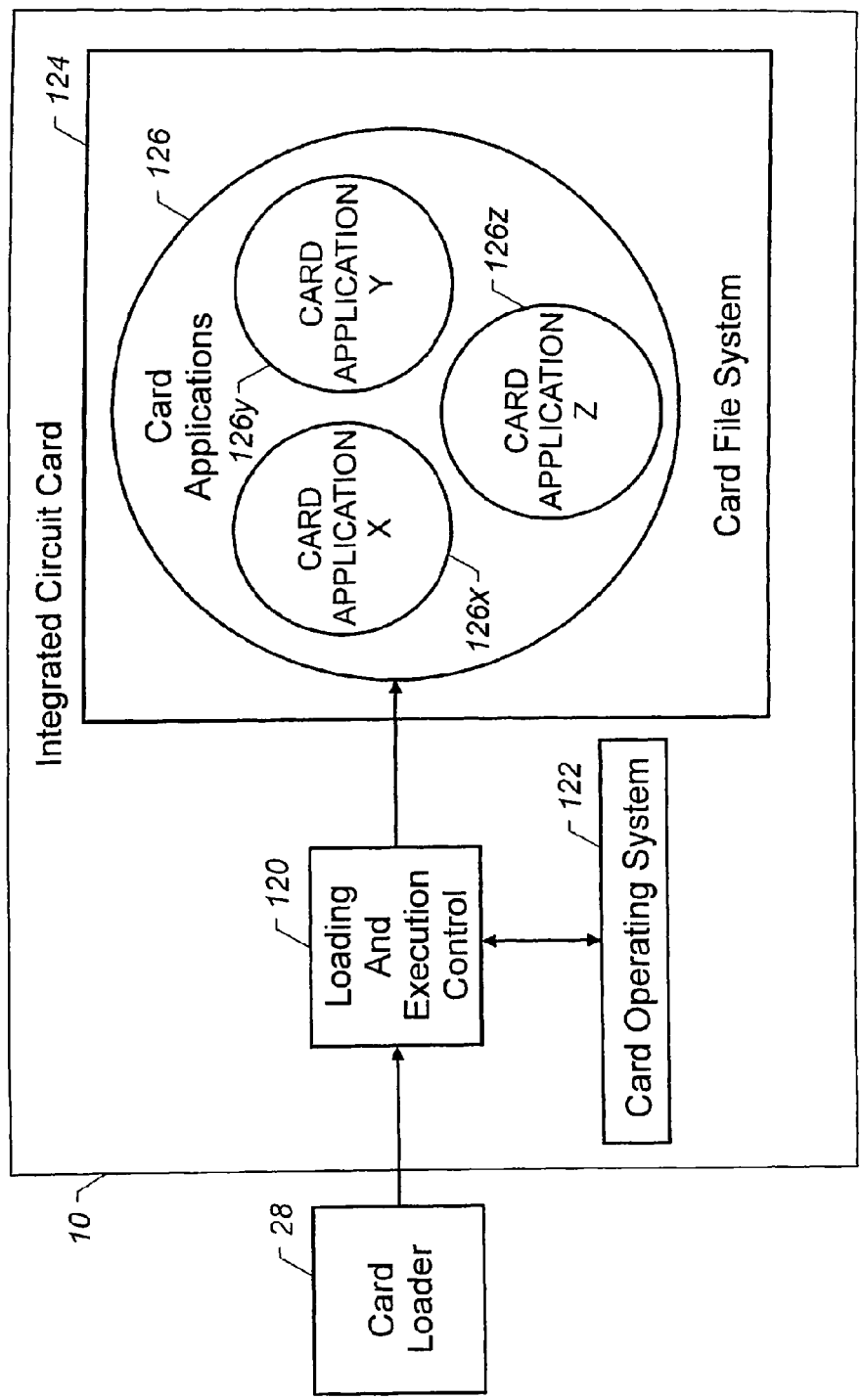
FIG. 12 is a block diagram illustrating loading applications into an integrated circuit card.

Referring to FIG. 12, the card loader 28 within the terminal 14 sends a card class file to the loading and execution control 120 within the integrated circuit card 10 using standard ISO 7816 commands. The loading and execution control 120 with a card operating system 122, which provides the necessary system resources, including support for a card file system 124, which can be used to store several card applications 126. Many conventional card loaders are written in low level languages, supported by the card operating system 122. In the preferred embodiment, the bootstrap loader is written in Java, and the integrated circuit card 10 includes a Java virtual machine to run this application. A Java implementation of the loading and execution control 120 is illustrated in Appendix E which is hereby incorporated by reference. The loading and execution control 120 receives the card class file 26 and produces a Java card application 126x stored in the card file system 126 in the EEPROM of the integrated circuit card 10. Multiple Java card applications 126x, 126y, and 126z can be stored in a single card in this manner. The loading and execution control 120 supports commands whereby the terminal 14 can select which Java card application to run immediately, or upon the next card reset.

Figure 13:
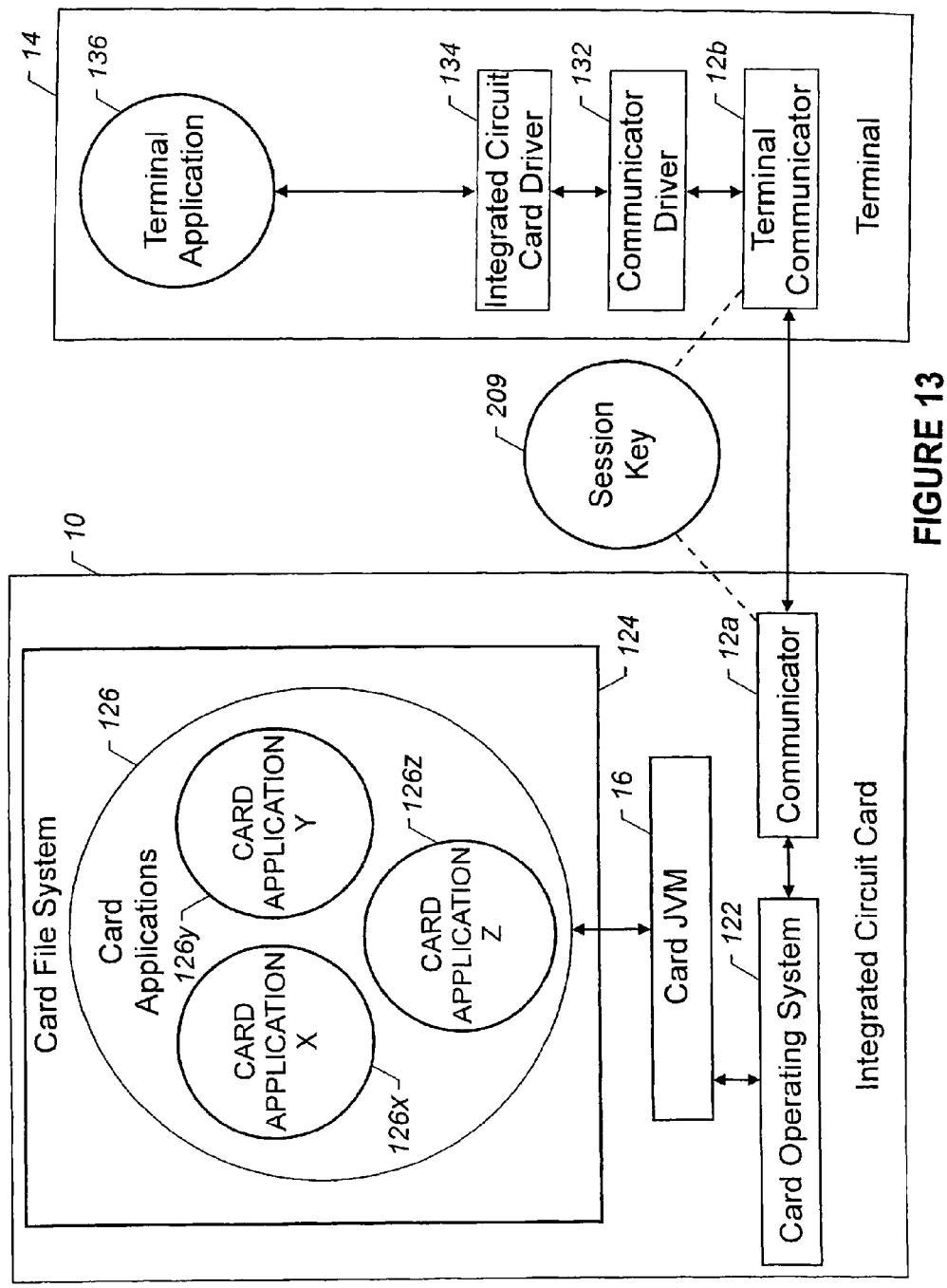
FIG. 13 is a block diagram illustrating executing applications in an integrated circuit card.

Referring to FIG. 13, upon receiving a reset or an execution command from the loading and execution control 120, the Card Java Virtual Machine (Card JVM) 16 begins execution at a predetermined method (for example, main) of the selected class in the selected Java Card application 126z. The Card JVM 16 provides the Java card application 126z access to the underlying card operating system 122, which provides capabilities such as I/O, EEPROM support, file systems, access control, and other system functions using native Java methods as illustrated in Appendix F which is hereby incorporated by reference.

The selected Java card application 126z communicates with an appropriate application in the terminal 14 using the communicator 12a to establish a communication channel to the terminal 14. Data from the communicator 12a to the terminal 14 passes through a communicator driver 132 in the terminal, which is specifically written to handle the communications protocol used by the communicator 12a. The data then passes to an integrated circuit card driver 134, which is specifically written to address the capabilities of the particular integrated circuit card 10 being used, and provides high level software services to the terminal application 136. In the preferred embodiment, this driver would be appropriate PC/SC Smartcard Service Provider (SSP) software. The data then passes to the terminal application 136, which must handle the capabilities provided by the particular card application 126z being run. In this manner, commands and responses pass back and forth between the terminal application 136 and the selected card application 126z. The terminal application interacts with the user, receiving commands from the user, some of which are passed to the selected Java card application 126z, and receiving responses from the Java card application 126z, which are processed and passed back to the user.

Figure 14:
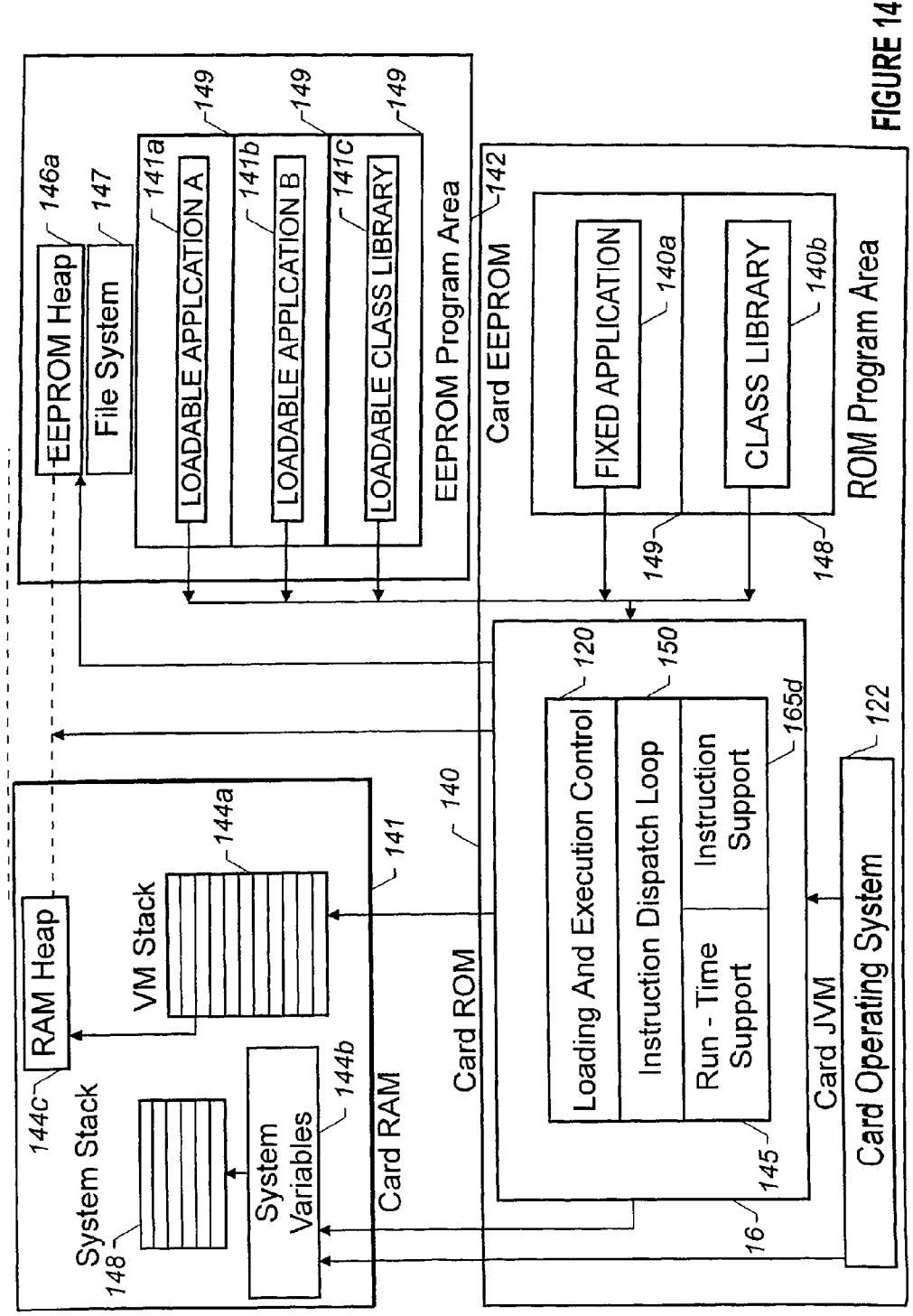
FIG. 14 is a schematic diagram illustrating memory organization for ROM, RAM and EEPROM.

Referring to FIG. 14, the Card JVM 16 is an interpreter that interprets a card application 126x. The memory resources in the microcontroller that impact the Card JVM 16 are the Card ROM 140, Card RAM 141 and the Card EEPROM 142. The Card ROM 140 is used to store the Card JVM 16 and the card operating system 122. Card ROM 140 may also be used to store fixed card applications 140a and class libraries 140b. Loadable applications 141a, 141b and libraries 141c may be stored in Card EEPROM 142. Loadable applications 141a, 141b and libraries 141c may also be stored in Card RAM 141. The Card JVM 16 interprets a card application 141a, 141b, or 140a. The Card JVM 16 uses the Card RAM to store the VM stack 144a and system state variables 144b. The Card JVM 16 keeps track of the operations performed via the VM stack 144a. The objects created by the Card JVM 16 are either on the RAM heap 144c, in the EEPROM heap 146a, or in the file system 147.

All of the heap manipulated by the Card JVM 16 may be stored in the Card RAM 141 as a RAM Heap 144c, or it may be distributed across to the Card EEPROM 142 as a EEPROM Heap 146a. Card RAM 141 is also used for recording the state of the system stack 148 that is used by routines written in the native code of the microcontroller. The Card JVM 16 uses the Card EEPROM 142 to store application data either in the EEPROM heap 146a or in the file system 147. Application data stored in a file may be manipulated via an interface to the card operating system 122. This interface is provided by a class library 140b stored in Card ROM 140, by a loadable class library 141c stored in Card EEPROM 142. One such interface is described in Appendix F. Applications and data in the card are isolated by a firewall mechanism 149.

To cope with the limited resources available on microcontrollers, the Card JVM 16 implements a strict subset of the Java programming language. Consequently, a Java application 20 compiles into a class file that contains a strict subset of Java byte codes. This enables application programmers to program in this strict subset of Java and still maintain compatibility with existing Java Virtual Machines. The semantics of the Java byte codes interpreted by the Card JVM 16 are described in the aforementioned Java Virtual Machine Specification. The subset of byte codes interpreted by the Card JVM 16 can be found in Appendix C. The card class file converter 26 checks the Java application 20 to ensure use of only the features available in this subset and converts into a form that is understood and interpreted by the Card JVM 16.

In other embodiments, the Card JVM 16 is designed to interpret a different set or augmented set of byte codes 116. Although a different byte code set might lead to some performance improvements, departing from a strict Java subset may not be desirable from the point of view of security that is present in the original Java byte codes or compatibility with mainstream Java development tools.

All Card JVM 16 applications 126 have a defined entry point denoted by a class and a method in the class. This entry point is mapped in the string to ID input map 30 and assigned by the card class file converter 26. Classes, methods and fields within a Java application 20 are assigned IDs by the card class file converter 26. For example, the ID corresponding to the main application class may be defined as F001 and the ID corresponding to its main method, such as "main( )v" could be defined as F002.

Figure 15:
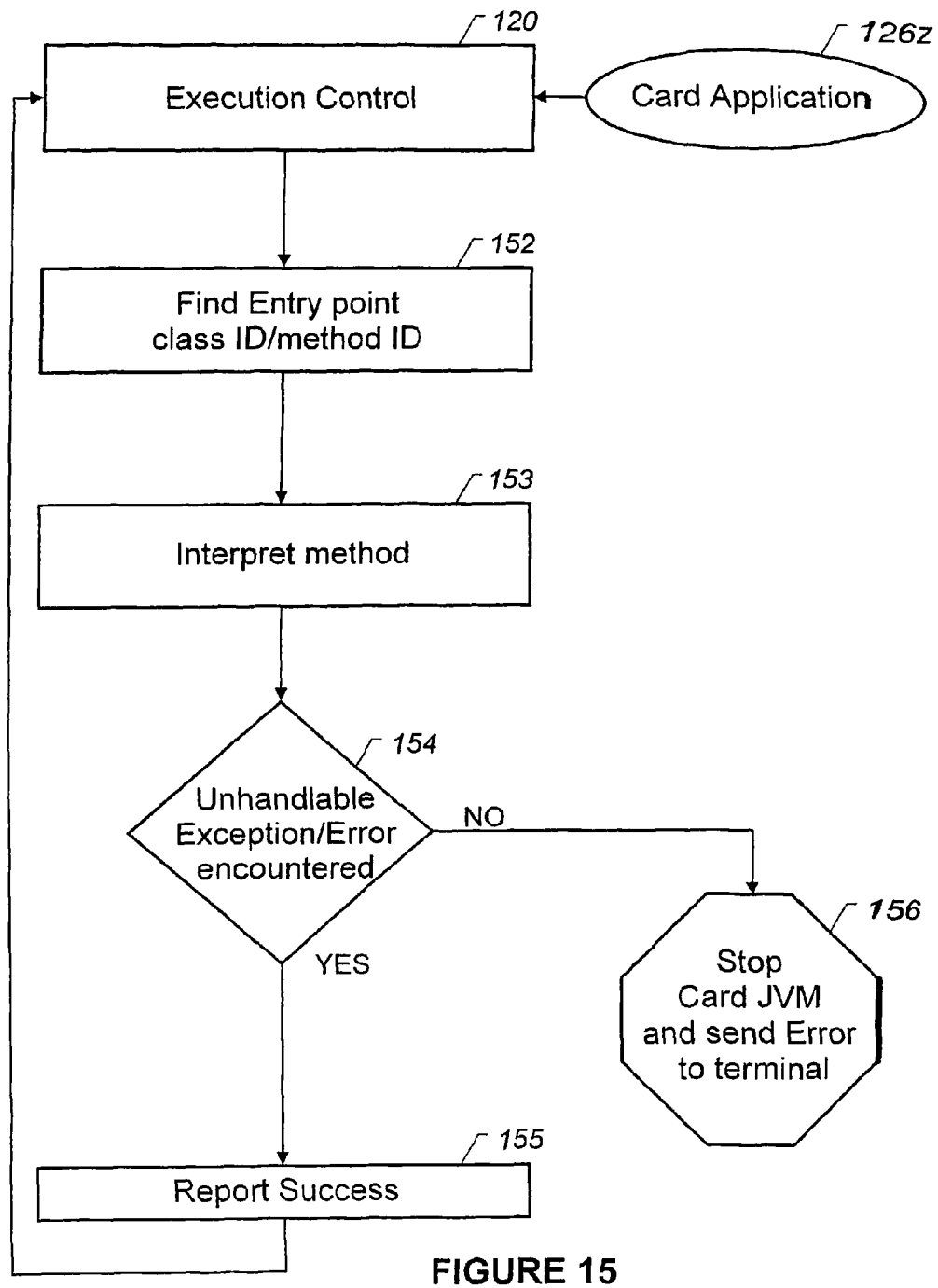
FIG. 15 is a flow diagram illustrating the overall architecture of the Card Java virtual machine.

The overall execution architecture of the Card JVM is described by the flowchart in FIG. 15. Execution of the Card JVM 16 begins at the execution control 120, which chooses a card application 126z to execute. It proceeds by finding and assigning an entry point 152 (a method) in this card application for the Card JVM 16 to interpret. The Card JVM 16 interprets the method 153. If the interpretation proceeds successfully 154, the Card JVM 16 reports success 155 returning control back to the execution control 120. If in the course of interpretation 153 the Card JVM 16 encounters an unhandled error or exception (typically a resource limitation or a security violation), the Card JVM 16 stops 156 and reports the appropriate error to the terminal 14.

Figure 16:
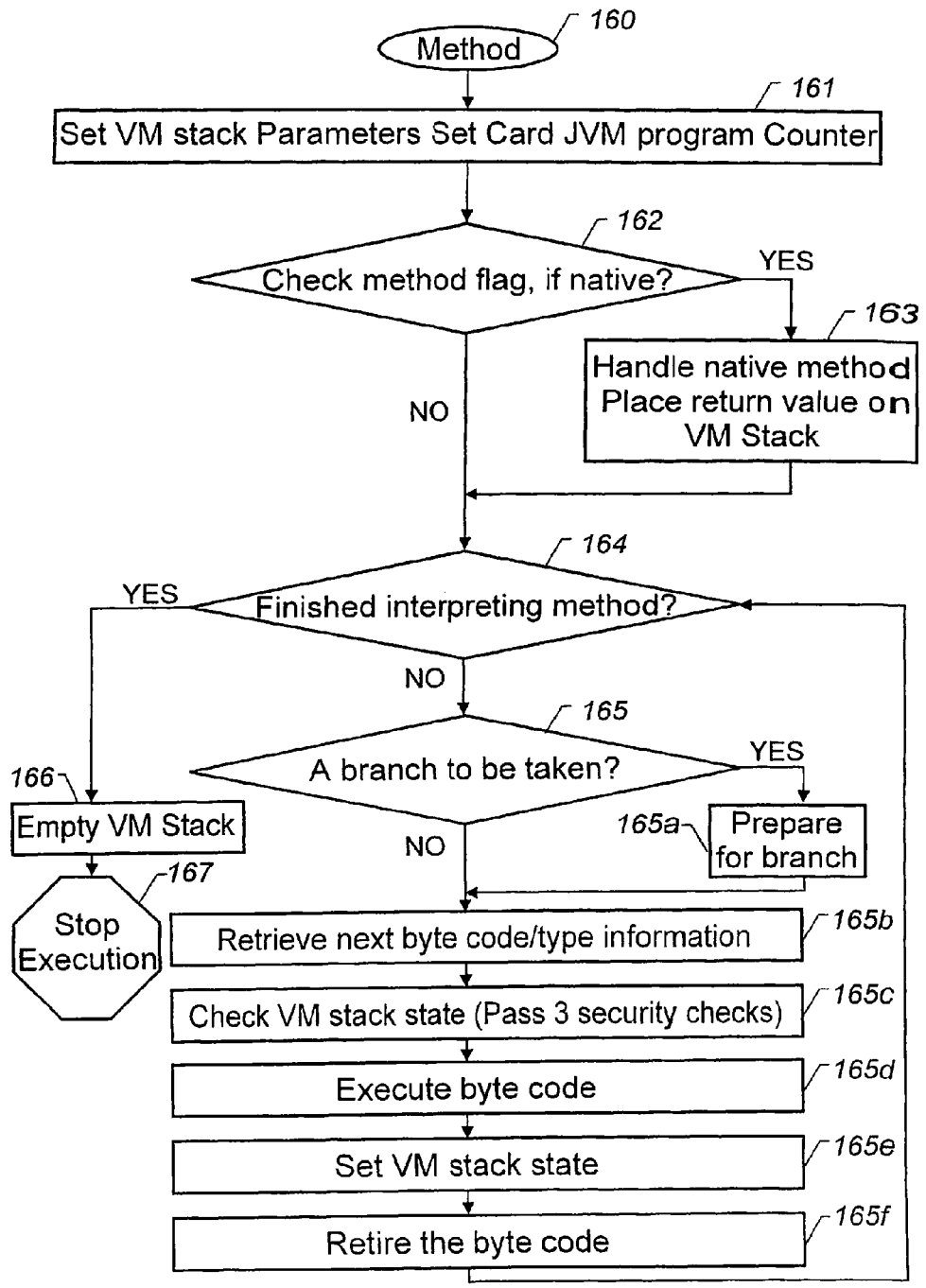
FIG. 16 is a flow diagram illustrating method execution in the Card Java virtual machine with the security checks.

An essential part of the Card JVM 16 is a subroutine that handles the execution of the byte codes. This subroutine is described by the flowchart in FIG. 16. Given a method 160 it executes the byte codes in this method. The subroutine starts by preparing for the parameters of this method 161. This involves setting the VM stack 144a pointer, VM stack 144a frame limits, and setting the program counter to the first byte code of the method.

Next, the method flags are checked 162. If the method is flagged native, then the method is actually a call to native method code (subroutine written in the microcontroller's native processor code). In this case, the Card JVM 16 prepares for an efficient call 163 and return to the native code subroutine. The parameters to the native method may be passed on the VM stack 144a or via the System stack 148. The appropriate security checks are made and the native method subroutine is called. On return, the result (if any) of the native method subroutine is placed on the VM stack 144a so that it may be accessed by the next byte code to be executed.

The dispatch loop 164 of the Card JVM 16 is then entered. The byte code dispatch loop is responsible for preparing, executing, and retiring each byte code. The loop terminates when it finishes interpreting the byte codes in the method 160, or when the Card JVM 16 encounters a resource limitation or a security violation.

If a previous byte code caused a branch to be taken 165 the Card JVM prepares for the branch 165a. The next byte code is retrieved 165b. In order to keep the cost of processing each byte code down, as many common elements such as the byte code arguments, length, type are extracted and stored.

To provide the security offered by the security model of the programming language, byte codes in the class file must be verified and determined conformant to this model. These checks are typically carried out in prior art by a program referred to as the byte code verifier, which operates in four passes as described in the Java Virtual Machine Specification. To offer the run-time security that is guaranteed by the byte code verifier, the Card JVM 16 must perform the checks that pertain to the Pass 3 and Pass 4 of the verifier. This checking can be bypassed by the Card JVM 16 if it can be guaranteed (which is almost impossible to do) that the byte codes 60 interpreted by the Card JVM 16 are secure. At the minimum, code security can be maintained as long as object references cannot be faked and the VM stack 144a and local variable bounds are observed. This requires checking the state of the VM stack 144a with respect to the byte code being executed.

To enforce the security model of the programming language, a 256-byte table is created as shown in Appendix G which is hereby incorporated by reference. This table is indexed by the byte code number. This table contains the type and length information associated with the indexing byte code. It is encoded with the first 5 bits representing type, and the last 3 bits representing length. The type and length of the byte code is indexed directly from the table by the byte code number. This type and length is then used for checking as shown in Appendix H which is hereby incorporated by reference. In Appendix H, the checking process begins by decoding the length and type from the table in Appendix G which is hereby incorporated by reference. The length is used to increment the program counter. The type is used first for pre-execution checking, to insure that the data types on the VM stack 144a are correct for the byte code that is about to be executed. The 256 bytes of ROM for table storage allows the original Java byte codes to be run in the Card JVM 16 and minimizes the changes required to the Java class file to be loaded in the card. Additional Java byte codes can be easily supported since it is relatively easy to update the appropriate table entries.

In other embodiments, as shown in FIG. 10, the Java byte codes in the method are renumbered in such a manner that the byte code type and length information stored in the table in Appendix H is implicit in the reordering. Appendix H is hereby incorporated by reference. Consequently, the checks that must be performed on the state of the VM stack 144a and the byte code being processed does not have to involve a table look up. The checks can be performed by set of simple comparisons as shown in Appendix I which is hereby incorporated by reference. This embodiment is preferable when ROM space is at a premium, since it eliminates a 256-byte table. However adding new byte codes to the set of supported byte codes has to be carefully thought out since the new byte codes have to fit in the implicit numbering scheme of the supported byte codes.

Figure 18:
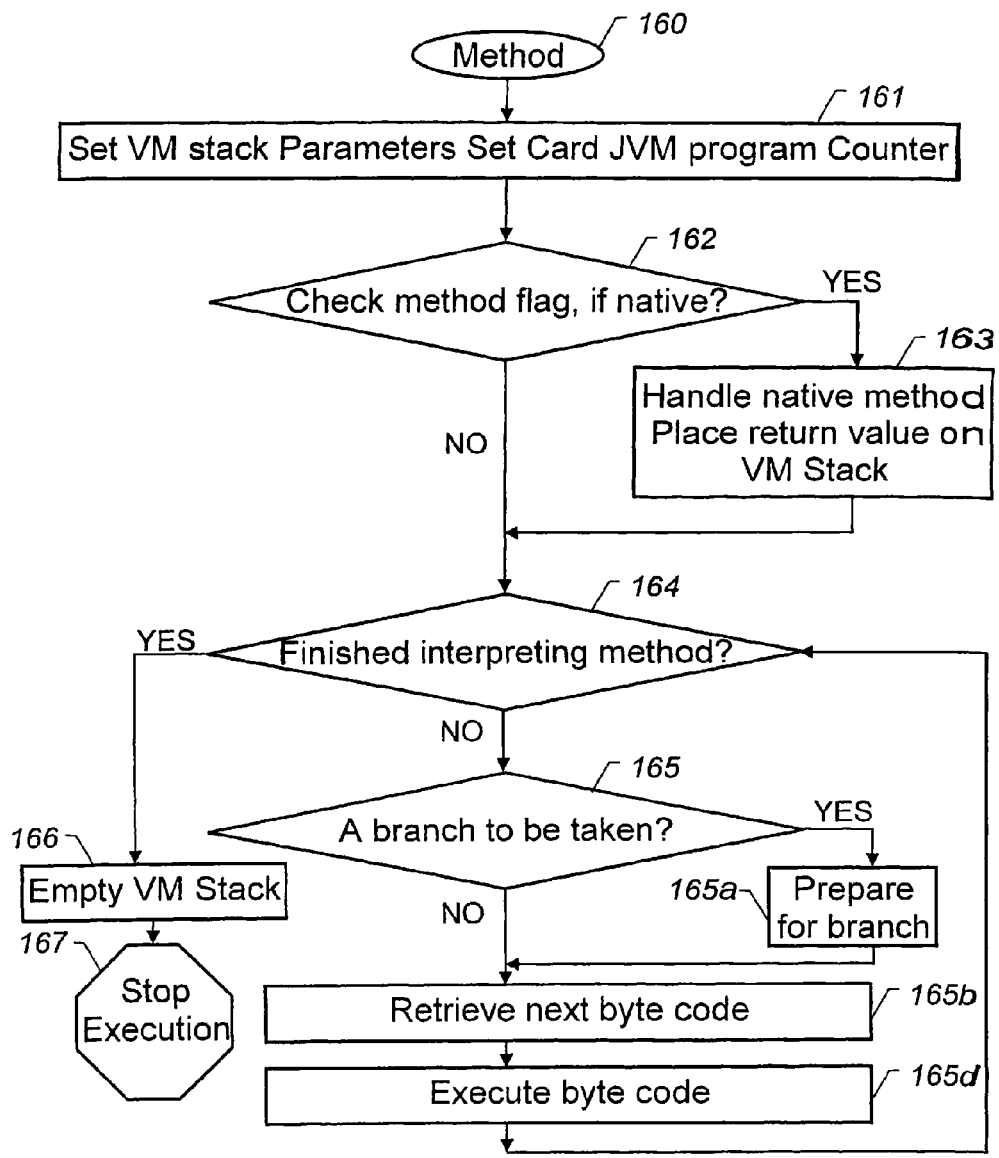
FIG. 18 is a flow diagram illustrating method execution in the Card Java virtual machine without the security checks.

In another embodiment, the Card JVM 16 chooses not to perform any security checks in favor of Card JVM 16 execution speed. This is illustrated in the flowchart in FIG. 18. The flow chart in FIG. 18 is the same as that of FIG. 16 with the security checks removed. This option is not desirable from the point of view of security, unless it can be guaranteed that the byte codes are secure.

The Card JVM 16 may enforce other security checks as well. If the byte code may reference a local variable, the Card JVM 16 checks if this reference is valid, throwing an error if it is not. If the reference is valid, the Card JVM 16 stores the type of the local variable for future checking. The VM stack 144a pointer is checked to see if it is still in a valid range. If not an exception is thrown. The byte code number is checked. If it is not supported, an exception is thrown.

Figure 17:
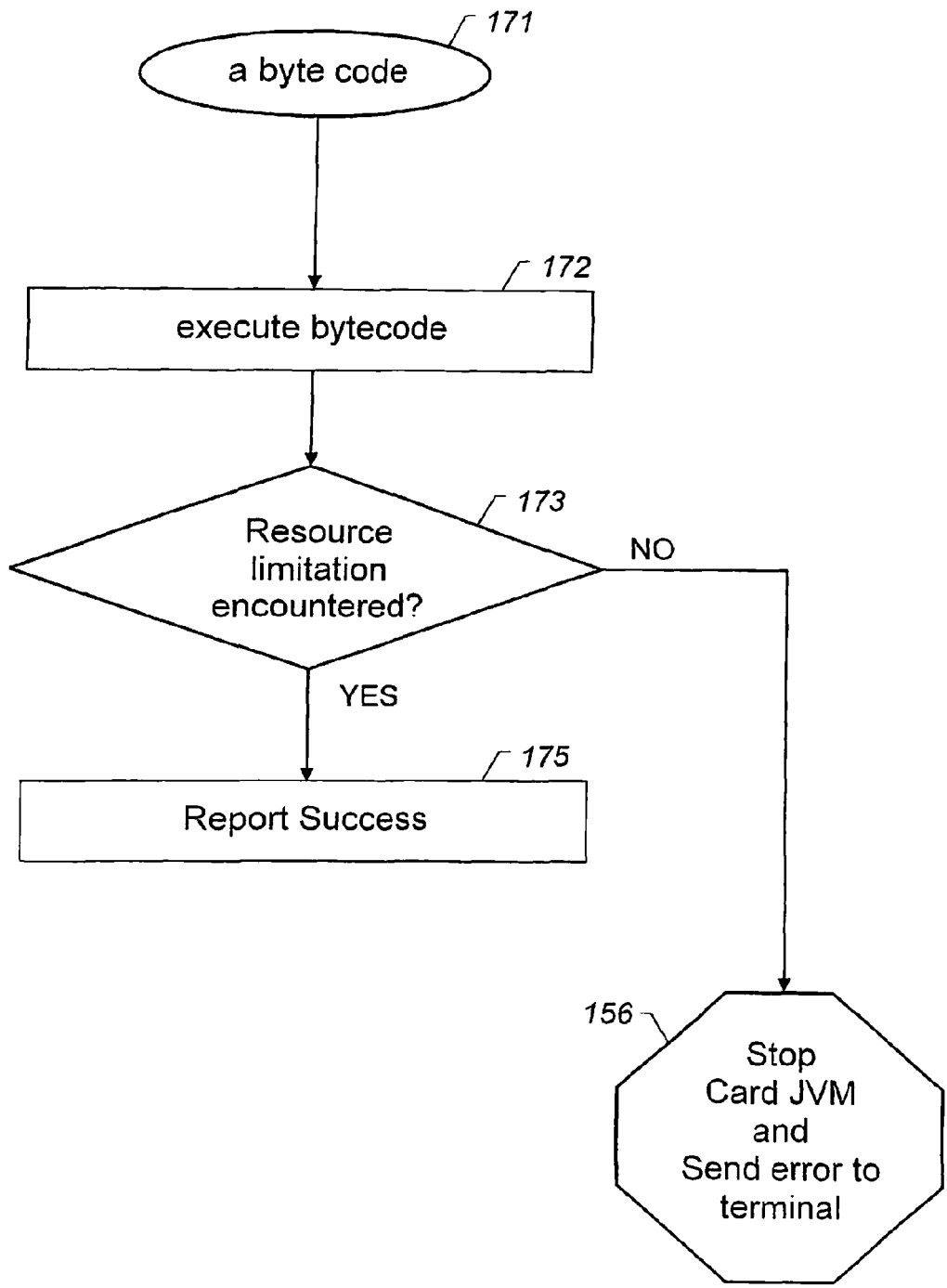
FIG. 17 is a flow diagram illustrating byte code execution in the Card Java virtual machine.

Finally, the byte code itself is dispatched 165d. The byte codes translated by the Card JVM 16 are listed in Appendix C. The semantics of the byte codes are described in the aforementioned Java Virtual Machine Specification with regard to the state of the VM stack 144a before and after the dispatch of the byte code. Note also that some byte codes (the byte codes, INVOKESTATIC, INVOKESPECIAL, INVOKENONVIRTUAL and INVOKEVIRTUAL) may cause reentry into the Card JVM 16, requiring processing to begin at the entry of the subroutine 161. FIG. 17 shows the flowchart of the byte code execution routine. The routine is given a byte code 171 to execute. The Card JVM 16 executes 172 the instructions required for the byte code. If in the course of executing the Card JVM 16 encounters a resource limitation 173, it returns an error 156. This error is returned to the terminal 16 by the Card JVM 16. If the byte code executes successfully, it returns a success 175.

After execution, the type of the result is used to set the VM stack 144a state correctly 165e, properly flagging the data types on the VM stack 144a. The byte code information gathered previously 165b from the byte code info table is used to set the state of the VM stack 144a in accordance with the byte code that just executed.

In other embodiments, setting the output state of the VM stack 144a with respect to the byte code executed is simplified if the byte code is renumbered. This is shown in Appendix I which is hereby incorporated by reference.

In yet another embodiment, the Card JVM 16 may bypass setting the output state of the VM stack 144a in favor of Card JVM 16 execution speed. This option is not desirable from the point of view of security, unless it can be guaranteed that the byte codes are secure.

After the byte code has been executed, the byte code is retired 165f. This involves popping arguments off the VM stack 144a. Once byte code processing is completed, the loop 164 is repeated for the next byte code for the method.

Once the dispatch loop 164 terminates, the VM stack 144a is emptied 166. This prevents any object references filtering down to other Card JVM 16 invocations and breaking the Card JVM's 16 security. Termination 167 of the byte code dispatch loop 164 indicates that the Card JVM 16 has completed executing the requested method.

To isolate data and applications in the integrated circuit card 10 from each other, the integrated circuit card 10 relies on the firewall mechanism 149 provided by the Card JVM 16. Because the Card JVM implements the standard pass 3 and pass 4 verifier checks, it detects any attempt by an application to reference the data or code space used by another application, and flag a security error 156. For example, conventional low level applications can cast non-reference data types into references, thereby enabling access to unauthorized memory space, and violating security. With this invention, such an attempt by a card application 126z to use a non-reference data type as a reference will trigger a security violation 156. In conventional Java, this protected application environment is referred to as the sandbox application-interpretation environment.

However, these firewall facilities do not work independently. In fact, the facilities are overlapping and mutually reinforcing with conventional access control lists and encryption mechanisms shown in the following table:

| | Access Control Lists | Virtual Machine | Encryption |
|---|---|---|---|
| Data Protection | access control before operation | access only to own namespace | data to another program encrypted |
| Program Protection | access control before execution | execution only on correct types | data encrypted in program's namespace |
| Communication Protection | access control on channels | channel controls in own namespace | only mutually authenticated parties can communicate |

Taken together, these facilities isolate both data and applications on the integrated circuit card 10 and ensure that each card application 126 can access only the authorized resources of the integrated circuit card 10.

Figure 19:
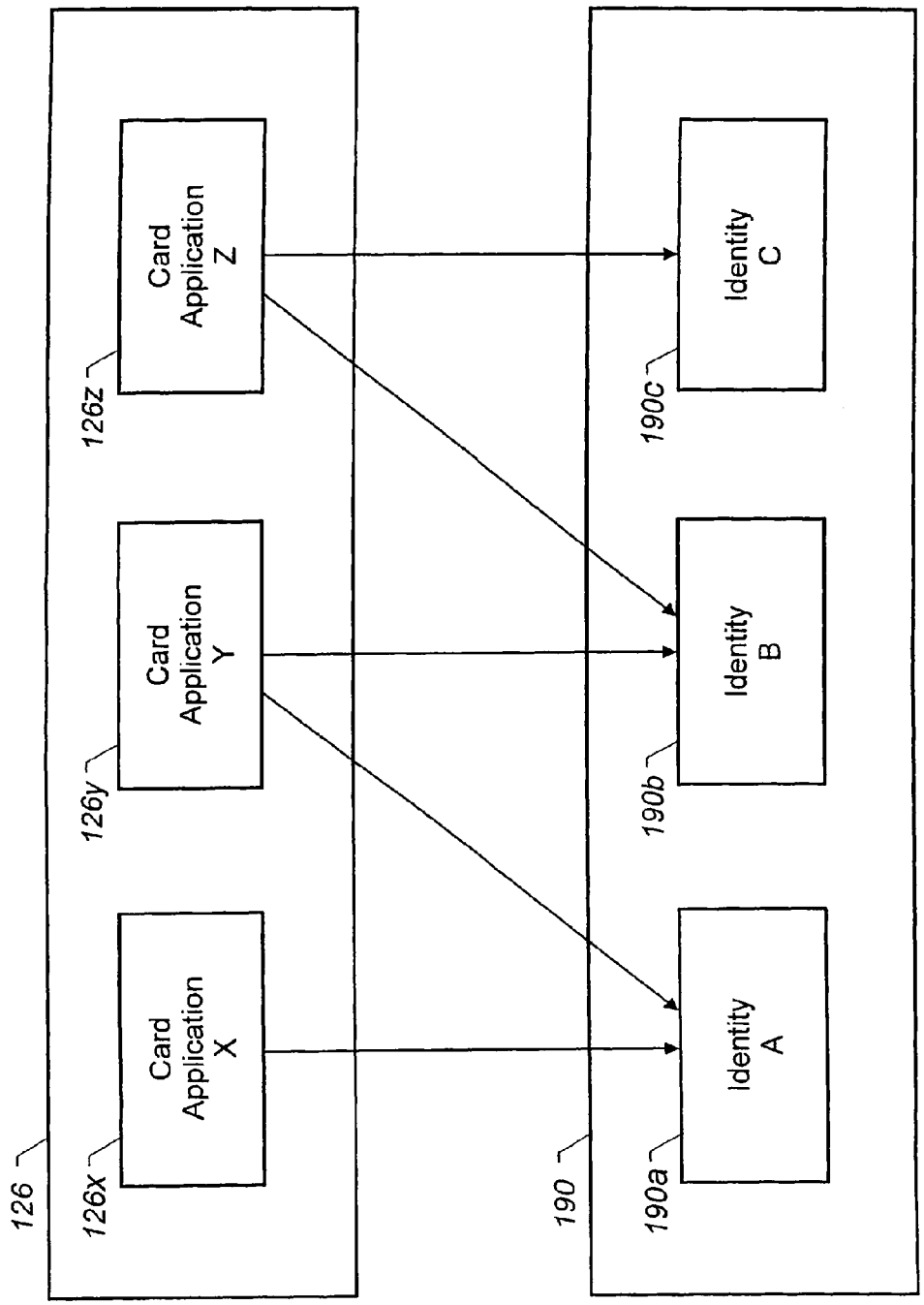
FIG. 19 is a block diagram illustrating the association between card applications and identities.

Referring to FIG. 19, card applications 126x, 126y, 126z can be endowed with specific privileges when the card applications 126 execute. These privileges determine, for example, which data files the card applications 126 can access and what operations the card applications 126 can perform on the file system 147. The privileges granted to the card applications 126 are normally set at the time that a particular card application 126z is started by the user, typically from the terminal 14.

Figure 20:
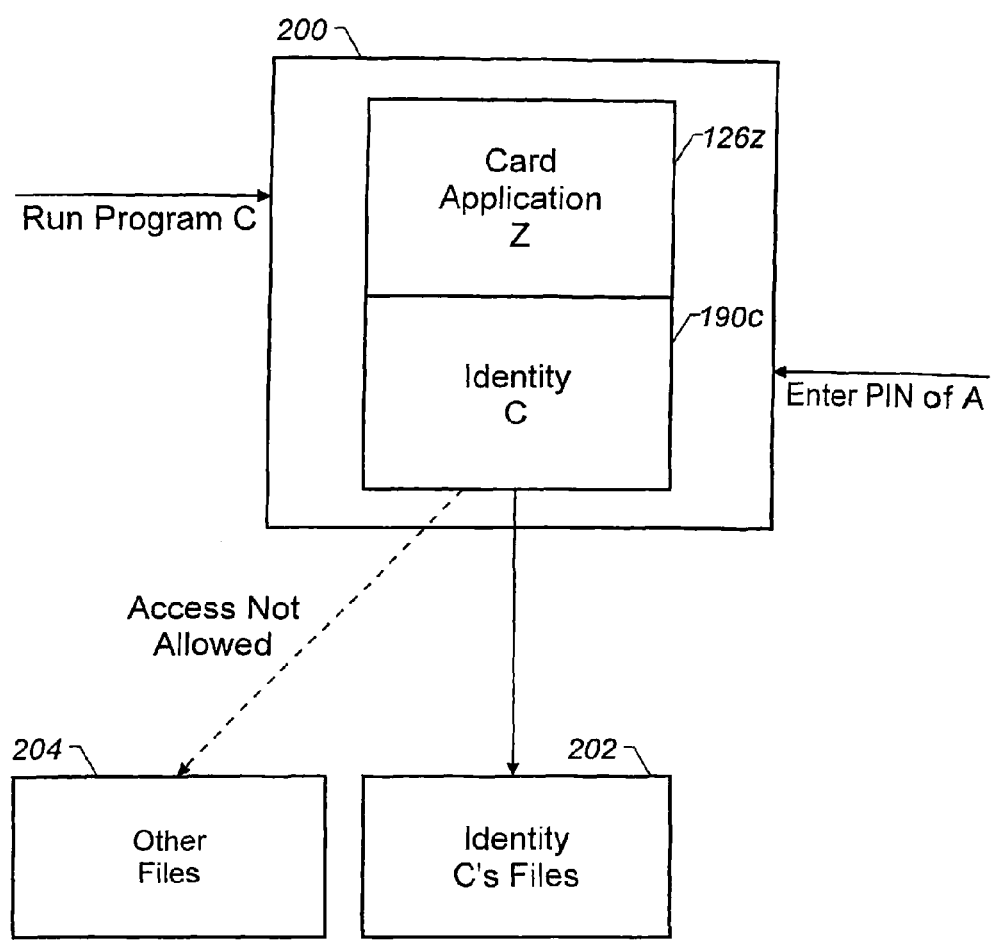
FIG. 20 is a block diagram illustrating the access rights of a specific running application.

The integrated circuit card 10 uses cryptographic identification verification methods to associate an identity 190 (e.g., identities 190a, 190b and 190c) and hence, a set of privileges to the execution of the card application 126. The association of the specific identity 190c to the card application 126z is made when the card application 126z begins execution, thus creating a specific running application 200, as shown in FIG. 20. The identity 190 is a unique legible text string reliably associated with an identity token. The identity token (e.g., a personal identification number (PIN) or a RSA private key) is an encryption key.

Referring to FIG. 20, in order to run a specific card application 126z, the identity 190c of the card application 126z must be authenticated. The identity 190c is authenticated by demonstrating knowledge of the identity token associated with the identity 190c. Therefore, in order to run the card application 126z, an agent (e.g., a card holder or another application wishing to run the application) must show that it possesses or knows the application's identity-defining encryption key.

One way to demonstrate possession of an encryption key is simply to expose the key itself. PIN verification is an example of this form of authentication. Another way to demonstrate the possession of an encryption key without actually exposing the key itself is to show the ability to encrypt or decrypt plain text with the key.

Thus, a specific running application 200 on the integrated circuit card 10 includes a card application 126z plus an authenticated identity 190c. No card application 126 can be run without both of these elements being in place. The card application 126z defines data processing operations to be performed, and the authenticated identity 190c determines on what computational objects those operations may be performed. For example, a specific application 126z can only access identity C's files 202 in the file system 147 associated with the specific identity 190c, and the specific card application 126z cannot access other files 204 that are associated with identities other than the specific identity 190c.

The integrated circuit card 10 may take additional steps to ensure application and data isolation. The integrated circuit card 10 furnishes three software features sets: authenticated-identity access control lists; a Java-based virtual machine; and one-time session encryption keys to protect data files, application execution, and communication channels, respectively. Collectively, for one embodiment, these features sets provide the application data firewalls 149 for one embodiment. The following discusses each software feature set and then shows how the three sets work together to insure application and data isolation on the integrated circuit card 10.

An access control list (ACL) is associated with every computational object (e.g., a data file or a communication channel) on the integrated circuit card 10 that is be protected, i.e., to which access is to be controlled. An entry on an ACL (for a particular computational object) is in a data format referred to as an e-tuple:

type:identity:permissions

The type field indicates the type of the following identity (in the identity field), e.g., a user (e.g., "John Smith"), or a group. The permissions field indicates a list of operations (e.g., read, append and update) that can be performed by the identity on the computational object.

As an example, for a data file that has the ACL entry:
USER:AcmeAirlines:RAU, any application whose identity is "AcmeAirlines" can read ("R"), append ("A") and update ("U") the data file. In addition, the ACL may be used selectively to permit the creation and deletion of data files. Furthermore, the ACL may be used selectively to permit execution of an application.

Whenever a computational object is accessed by a running application 200, the access is intercepted by the Card JVM 16 and passed to the card operating system 122, which determines if there is an ACL associated with the object. If there is an associated ACL, then the identity 190c associated with the running application 200 is matched on the ACL. If the identity is not found or if the identity is not permitted for the type of access that is being requested, then the access is denied. Otherwise, the access is allowed to proceed.

Referring to FIG. 13, to prevent the potential problems due to the single data path between the integrated circuit card 10 and the terminal 14, communication channel isolation is accomplished by including in the identity authentication process the exchange of a one-time session key 209 between the a card application 126z and the terminal application 136. The key 209 is then used to encrypt subsequent traffic between the authenticating terminal application 136 and the authenticated card application 126z. Given the one-time session key 209, a rogue terminal application can neither "listen in" on an authenticated communication between the terminal 14 and the integrated circuit card 10, nor can the rogue terminal application "spoof" the card application into performing unauthorized operations on its behalf.

Encryption and decryption of card/terminal traffic can be handled either by the card operating system 122 or by the card application itself 126z. In the former case, the communication with the terminal 14 is being encrypted transparently to the application, and message traffic arrives decrypted in the data space of the application. In the latter case, the card application 126z elects to perform encryption and decryption to provide an extra layer of security since the application could encrypt data as soon as it was created and would decrypt data only when it was about to be used. Otherwise, the data would remain encrypted with the session key 209.

Thus, the application firewall includes three mutually reinforcing software sets. Data files are protected by authenticated-identity access control lists. Application execution spaces are protected by the Card JVM 16. Communication channels are protected with one-time session encryption keys 209.

In other embodiments, the above-described techniques are used with a microcontroller (such as the processor 12) may control devices (e.g., part of an automobile engine) other than an integrated circuit card. In these applications, the microcontroller provides a small platform (i.e., a central processing unit, and a memory, both of which are located on a semiconductor substrate) for storing and executing high level programming languages. Most existing devices and new designs that utilize a microcontroller could use this invention to provide the ability to program the microcontroller using a high level language, and application of this invention to such devices is specifically included.

The term application includes any program, such as Java applications, Java applets, Java aglets, Java servlets, Java commlets, Java components, and other non-Java programs that can result in class files as described below.

Class files may have a source other than Java program files. Several programming languages other than Java also have compilers or assemblers for generating class files from their respective source files. For example, the programming language Eiffel can be used to generate class files using Pirmin Kalberer's "J-Eiffel", an Eiffel compiler with JVM byte code generation (web site: http://www.spin.ch/.about.kalberer/jive/index.htm). An Ada 95 to Java byte code translator is described in the following reference (incorporated herein by reference): Taft, S. Tucker, "Programming the Internet in Ada 95", proceedings of Ada Europe '96, 1996. Jasmin is a Java byte code assembler that can be used to generate class files, as described in the following reference (incorporated herein by reference): Meyer, Jon and Troy Downing, "Java Virtual Machine", O'Reilly, 1997. Regardless of the source of the class files, the above description applies to languages other than Java to generate codes to be interpreted.

Figure 21:
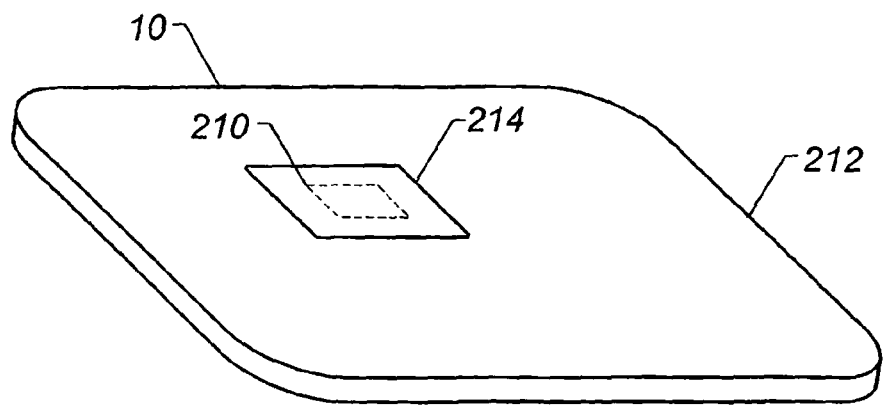
FIG. 21 is a perspective view of a microcontroller on a smart card.

FIG. 21 shows an integrated circuit card, or smart card, which includes a microcontroller 210 that is mounted to a plastic card 212. The plastic card 212 has approximately the same form factor as a typical credit card. The communicator 12a can use a contact pad 214 to establish a communication channel, or the communicator 12a can use a wireless communication system.

Figure 22:
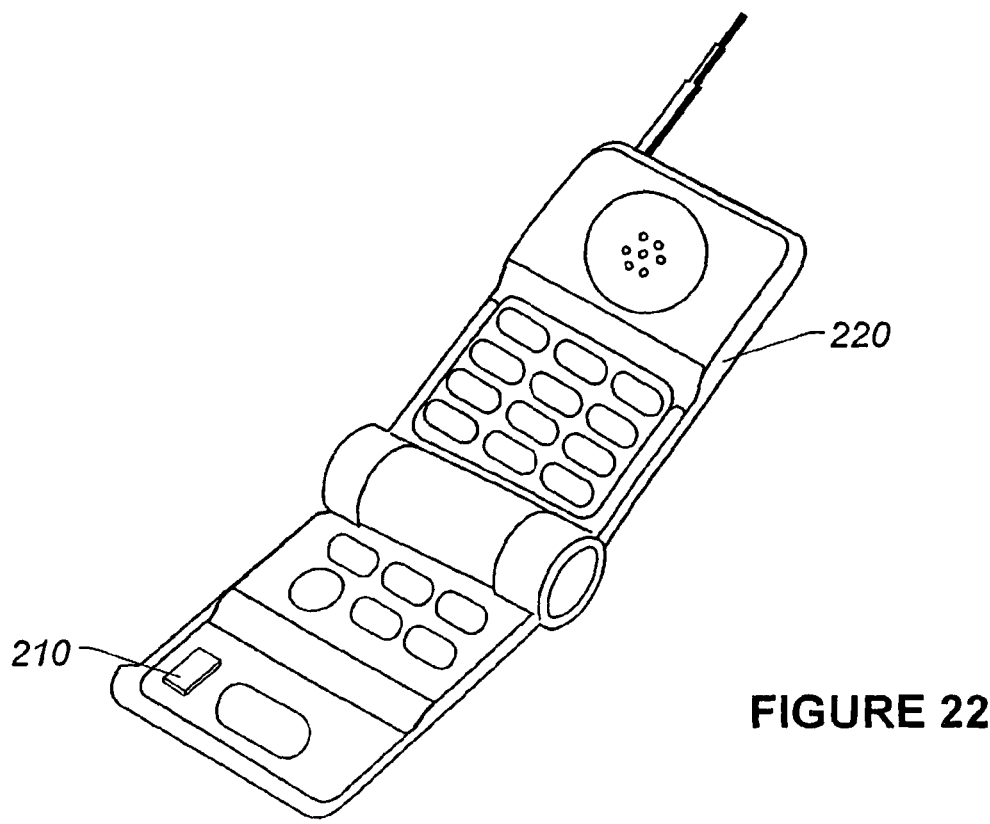
FIG. 22 is a perspective view of a microcontroller on a telephone.

In other embodiments, a microcontroller 210 is mounted into a mobile or fixed telephone 220, effectively adding smart card capabilities to the telephone, as shown in FIG. 22. In these embodiments, the microcontroller 210 is mounted on a module (such as a Subscriber Identity Module (SIM)), for insertion and removal from the telephone 220.

Figure 23:
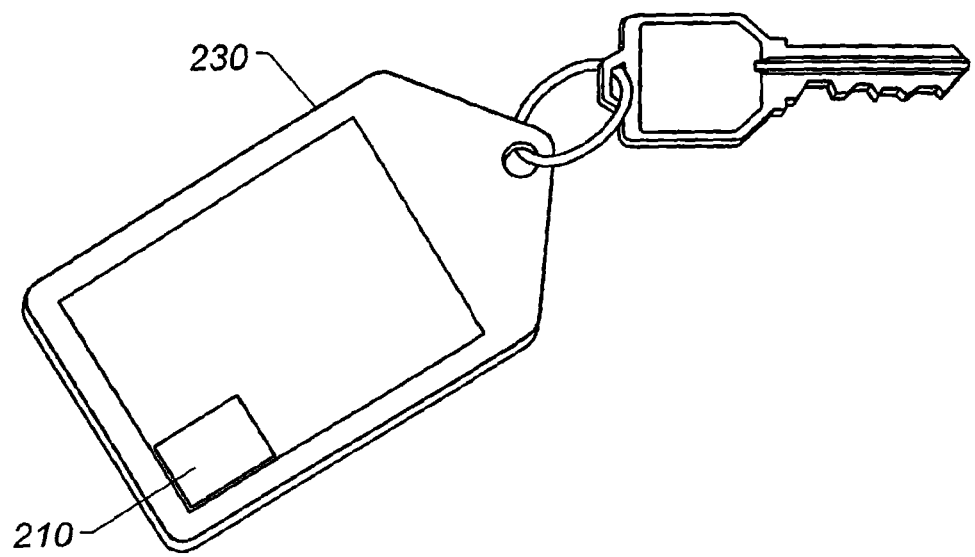
FIG. 23 is a perspective view of a microcontroller on a key ring.

In other embodiments, a microcontroller 210 is added to a key ring 230 as shown in FIG. 23. This can be used to secure access to an automobile that is equipped to recognize the identity associated with the microcontroller 210 on the key ring 230.

Figure 24:
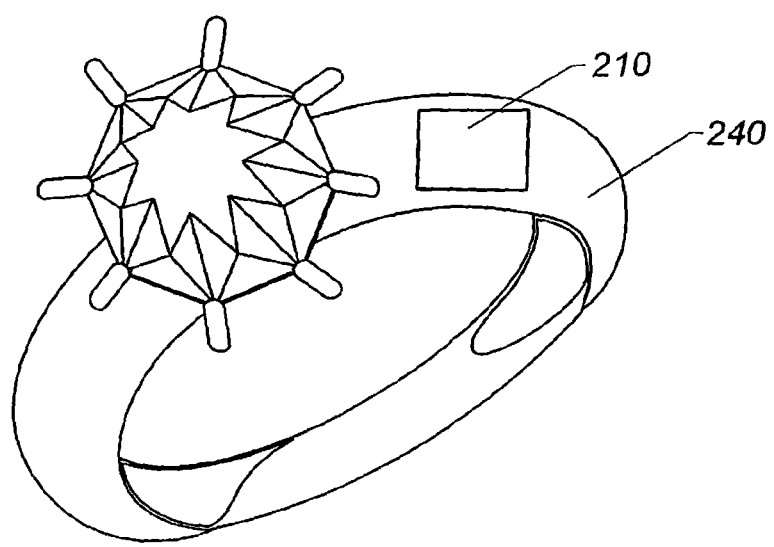
FIG. 24 is a perspective view of a microcontroller on a ring.

Jewelry such as a watch or ring 240 can also house a microcontroller 210 in an ergonomic manner, as shown in FIG. 24. Such embodiments typically use a wireless communication system for establishing a communication channel, and are a convenient way to implement access control with a minimum of hassle to the user.

Figure 25:
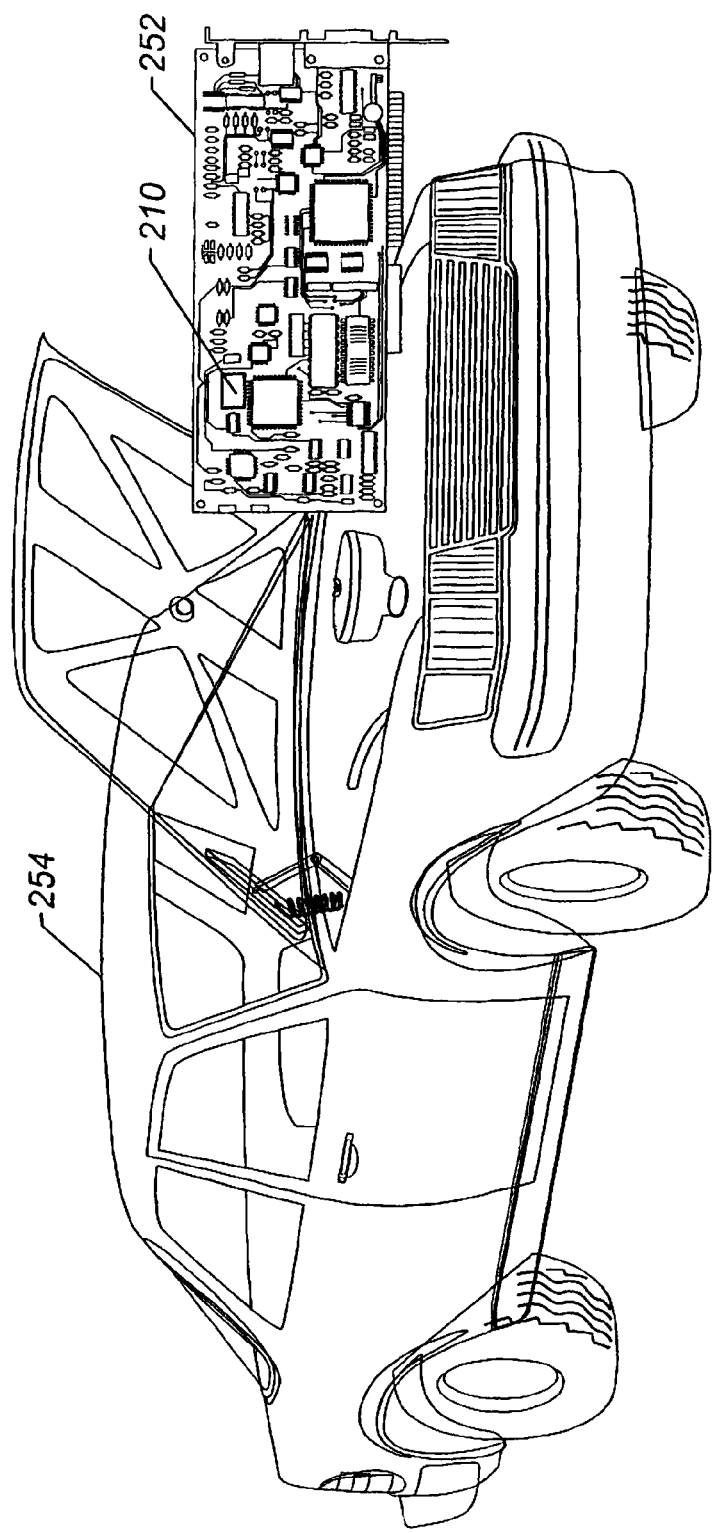
FIG. 25 is a perspective view of a microcontroller on a circuit card of an automobile.

FIG. 25 illustrates a microcontroller 210 mounted in an electrical subsystem 252 of an automobile 254. In this embodiment, the microcontroller is used for a variety of purposes, such as to controlling access to the automobile, (e.g. checking identity or sobriety before enabling the ignition system of the automobile), paying tolls via wireless communication, or interfacing with a global positioning system (GPS) to track the location of the automobile, to name a few.

While specific embodiments of the present invention have been described, various modifications and substitutions will become apparent to one skilled in the art by this disclosure. Such modifications and substitutions are within the scope of the present invention, and are intended to be covered by the appended claims.

The invention claimed is:

1. A device comprising:
a first memory, a second memory and a processor connected to the first and second memories;
the second memory storing:
multiple applications for the device including an application for the device obtained from an application source program written in high level language source code form wherein the application for the device is obtained from the application source program by first compiling the application source program into a compiled form interpretable by a first interpreter and not interpretable by a second interpreter and then converting the compiled form into a converted form interpretable by the second interpreter and not interpretable by the first interpreter, and
the first memory storing:
the second interpreter configured to interpret applications in the converted form; and
the processor configured to use the second interpreter to interpret the applications for the device for execution.

2. The device of claim 1 wherein the converting of the compiled form comprises removal of program parts.

3. The device of claim 2 wherein the program parts are attributes.

4. The device of claim 2 wherein the program parts are program parts not necessary for interpretation of the application for the device by the interpreter configured to interpret applications in the converted form.

5. The device of claim 2 wherein the program parts are parts not necessary for interpretation.

6. The device of claim 1 wherein the interpreter is operable to recognize a method invocation as being an invocation of a native code subroutine and upon recognizing the method invocation as being an invocation of a native code subroutine, transferring control to the native code subroutine.

7. The device of claim 6 wherein the interpreter is operable to pass parameters to the native code subroutine on a stack associated with the interpreter.

8. The device of claim 6 wherein the interpreter is operable to pass parameters to the native code subroutine on a stack associated with an operating system of the device.

9. The device of claim 1 wherein the converted form comprises a converted form class file, the device further comprising:
a load and execution control program operable to:
receive the converted form class file;
process the converted form class file to produce an application interpretable by the interpreter while the interpreter is executing on the device; and
to store the produced application interpretable by the interpreter in the second memory on the device.

10. The device of claim 9 wherein the load and execution control program is written in a high level programming language.

11. The device of claim 1 further comprising:
a load and execution control program operable to:
receive, from a device operable to produce an application selection indication, an application selection indicating which application for the device to execute; and
cause the interpreter to execute the selected application.

12. The device of claim 1, further comprising:
an input device connected to the processor and operable to provide an application selection indication.

13. The device of claim 12 wherein the input device connected to the processor and operable to provide an application selection indication is a device operable to communicate with the device.

14. The device of claim 13 wherein the input device operable to communicate with the device is an automated teller machine, a point-of-sale terminal, an access control system, a system that communicates with an integrated circuit card, or a system that communicates with a microcontroller.

15. A device comprising:
a processor connected to a memory;
the first memory comprising:
a second interpreter; and
the second memory comprising:
multiple applications for the device including at least one application for the device loaded in the memory to be interpreted by the second interpreter, wherein the at least one application for the device is generated by a programming environment comprising:
a) a compiler for compiling application source programs written in high level language source code form into a compiled form interpretable by a first interpreter and not interpretable by the second interpreter, and
b) a converter for post processing the compiled form into a form suitable for interpretation by the second interpreter and not interpretable by the first interpreter.

16. A system, comprising:
an input device operable to provide an application selection indication;
a device connected to the input device and comprising:
a first memory, a second memory and a processor connected to the first memory and the second memory;
the second memory storing:
an application for the device obtained from an application source program written in high level language source code form wherein the application for the device is obtained from the application source program by first compiling the application source program into a compiled form interpretable by a first interpreter and not interpretable by a second interpreter and then converting the compiled form into a converted form interpretable by the second interpreter and not interpretable by the first interpreter; and
the first memory storing:
the second interpreter configured to interpret applications in the converted form; and
the processor configured to receive the application selection indication from the input device and to use the second interpreter to interpret the application for the device selected using the application selection indication.

17. A method of operating a system having an input device operable to provide an application selection indication, a device connected to the input device and having: a first memory, a second memory and a processor, the second memory storing: an application for the device obtained from an application source program written in high level language source code form wherein the application for the device is obtained from the application source program by first compiling the application source program into a compiled form interpretable by a first interpreter and not interpretable by a second interpreter and then converting the compiled form into a converted form interpretable by the second interpreter and not interpretable by the first interpreter; and the first memory storing: the second interpreter configured to interpret applications in the converted form; and the processor coupled to the first memory and the second memory, the processor configured to receive the application selection indication from the input device and to use the interpreter to interpret the application for the device selected using the application selection indication, the method comprising:

receiving in the processor the application selection indication from the input device;

operating the processor according to the second interpreter configured to interpret applications in the converted form to interpret the application for the device selected using the received application selection indication and obtained from an application source program by converting a compiled form into a converted form.

18. The device of claim 15 wherein the post processing of the compiled form into a minimized form comprises removal of program parts.

19. The device of claim 18 wherein the program parts are attributes.

20. The device of claim 18 wherein the program parts are program parts not necessary for interpretation of the at least one application for the device by the interpreter.

21. The device of claim 18 wherein the program parts are parts not necessary for interpretation.

22. The device of claim 15 wherein the second interpreter is operable to recognize a method invocation as being an invocation of a native code subroutine and upon recognizing the method invocation as being an invocation of a native code subroutine, transferring control to the native code subroutine.

23. The device of claim 22 wherein the second interpreter is operable to pass parameters to the native code subroutine on a stack associated with the interpreter.

24. The device of claim 22 wherein the second interpreter is operable to pass parameters to the native code subroutine on a stack associated with an operating system of the device.

25. The device of claim 15 wherein the form suitable for interpretation by the second interpreter comprises a converted form class file, the device further comprising:

a load and execution control program operable to:
    receive the converted form class file;
    process the converted form class file to produce an application interpretable by the second interpreter while the second interpreter is executing on the device; and
    to store the produced application interpretable by the second interpreter in the memory of the device.

26. The device of claim 25 wherein the load and execution control program is written in a high level programming language.

27. The device of claim 15 further comprising:

a load and execution control program operable to:
    receive, from a device operable to produce an application selection indication, an application selection indicating a selected application of the at least one application for the device; and
    cause the second interpreter to execute the selected application.

28. The device of claim 15, further comprising:

an input device connected to the processor and operable to provide an application selection indication.

29. The device of claim 28 wherein the input device connected to the processor and operable to provide an application selection indication is a device operable to communicate with the device.

30. The device of claim 29 wherein the input device operable to communicate with the device is an automated teller machine, a point-of-sale terminal, an access control system, a system that communicates with an integrated circuit card, or a system that communicates with a microcontroller.

* * * * *